US010112118B2

(12) United States Patent
Davis

(10) Patent No.: US 10,112,118 B2
(45) Date of Patent: Oct. 30, 2018

(54) RIDE SYSTEM

(71) Applicant: TAIT TOWERS MANUFACTURING, LLC, Lititz, PA (US)

(72) Inventor: Adam Davis, Leola, PA (US)

(73) Assignee: TAIT TOWERS MANUFACTURING, LLC, Lititz, PA (US)

( * ) Notice: Subject to any disclaimer, the term of this patent is extended or adjusted under 35 U.S.C. 154(b) by 19 days.

(21) Appl. No.: 15/306,140

(22) PCT Filed: Jul. 7, 2015

(86) PCT No.: PCT/US2015/039290
§ 371 (c)(1),
(2) Date: Oct. 24, 2016

(87) PCT Pub. No.: WO2016/007455
PCT Pub. Date: Jan. 14, 2016

(65) Prior Publication Data
US 2017/0050115 A1 Feb. 23, 2017

Related U.S. Application Data

(63) Continuation of application No. 14/791,939, filed on Jul. 6, 2015, now abandoned, which is a continuation-in-part of application No. 14/324,935, filed on Jul. 7, 2014, now abandoned.

(51) Int. Cl.
| | | |
|---|---|---|
| *A63G 31/16* | (2006.01) | |
| *A63G 31/00* | (2006.01) | |
| *A63G 9/02* | (2006.01) | |
| *F16M 13/02* | (2006.01) | |
| *G06F 3/01* | (2006.01) | |

(Continued)

(52) U.S. Cl.
CPC ............ *A63G 31/00* (2013.01); *A63G 9/02* (2013.01); *A63G 31/16* (2013.01); *F16M 13/022* (2013.01); *G06F 3/012* (2013.01); *G06F 3/013* (2013.01); *G09G 5/14* (2013.01); *G09G 2354/00* (2013.01)

(58) Field of Classification Search
CPC ........ A63G 21/00; A63G 21/20; A63G 31/00; A63G 31/16; G02B 27/00; G02B 27/2292; G02B 27/225; A63J 5/00; A63J 25/00
USPC ............. 472/59–61, 130; 434/29, 30, 34, 55
See application file for complete search history.

(56) References Cited

U.S. PATENT DOCUMENTS

| | | | |
|---|---|---|---|
| 3,567,040 A | 3/1971 | Thomson | |
| 3,591,022 A | 7/1971 | Polyakov et al. | |
| 4,062,293 A | 12/1977 | Davis | |

(Continued)

FOREIGN PATENT DOCUMENTS

| | | |
|---|---|---|
| CA | 2932241 A1 | 2/2016 |
| EP | 1063064 A2 | 12/2000 |

(Continued)

*Primary Examiner* — Kien Nguyen
(74) *Attorney, Agent, or Firm* — McNees Wallace & Nurick LLC

(57) ABSTRACT

A ride system including a ride vehicle, the ride vehicle being operable to support a ride patron having a display arrangement for displaying a viewing script to the ride patron during a ride event during which the ride vehicle travels along an event path located within a volume.

9 Claims, 27 Drawing Sheets

(51) Int. Cl.
*G09G 5/14* (2006.01)
*G02B 27/00* (2006.01)

(56) References Cited

U.S. PATENT DOCUMENTS

| | | | |
|---|---|---|---|
| 4,932,541 A | 6/1990 | Belsterling | |
| 4,934,277 A | 6/1990 | Smith et al. | |
| 5,081,932 A | 1/1992 | Hofmann | |
| 5,570,638 A | 11/1996 | Egli et al. | |
| 5,585,707 A | 12/1996 | Thompson et al. | |
| 5,649,866 A | 7/1997 | Balwanz | |
| 6,354,954 B1 * | 3/2002 | Sumner | A63G 31/16 472/45 |
| 6,511,381 B1 | 1/2003 | Cochron | |
| 6,622,634 B2 | 9/2003 | Cylvick | |
| 6,695,291 B2 | 2/2004 | Kleinmyer et al. | |
| 6,808,459 B2 | 10/2004 | Checketts | |
| 7,784,408 B2 | 8/2010 | Muller | |
| 8,147,344 B2 | 4/2012 | Crawford et al. | |
| 8,166,885 B2 | 5/2012 | Kitchen | |
| 8,641,540 B2 | 2/2014 | Feuer et al. | |
| 8,684,854 B2 | 4/2014 | Fisher | |
| 8,768,492 B2 | 7/2014 | Fisher | |
| 8,920,251 B2 * | 12/2014 | Dietz | A63G 21/20 434/55 |
| 8,961,326 B2 | 2/2015 | Fisher | |
| 9,026,235 B2 | 5/2015 | Fisher | |
| 9,295,922 B2 | 3/2016 | Fisher | |
| 9,303,421 B1 | 4/2016 | Jennings | |
| 2003/0027646 A1 | 2/2003 | Checketts | |
| 2003/0168647 A1 | 9/2003 | Thompson et al. | |
| 2009/0066100 A1 | 3/2009 | Bosscher et al. | |
| 2010/0279255 A1 | 11/2010 | Williams, II | |
| 2012/0298825 A1 | 11/2012 | Fisher | |
| 2013/0079169 A1 | 3/2013 | Dietz et al. | |
| 2013/0109484 A1 | 5/2013 | Fisher | |
| 2014/0274431 A1 | 9/2014 | Schmidt | |
| 2016/0001190 A1 | 1/2016 | Davis | |

FOREIGN PATENT DOCUMENTS

| | | |
|---|---|---|
| EP | 2394720 A2 | 12/2011 |
| EP | 2572766 A1 | 3/2013 |
| JP | H08299600 A | 11/1996 |
| WO | 9523053 A1 | 8/1995 |
| WO | 2004060513 A1 | 7/2004 |

* cited by examiner

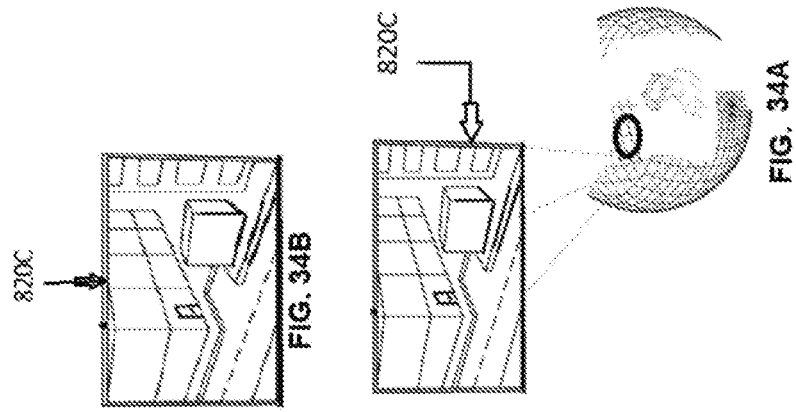
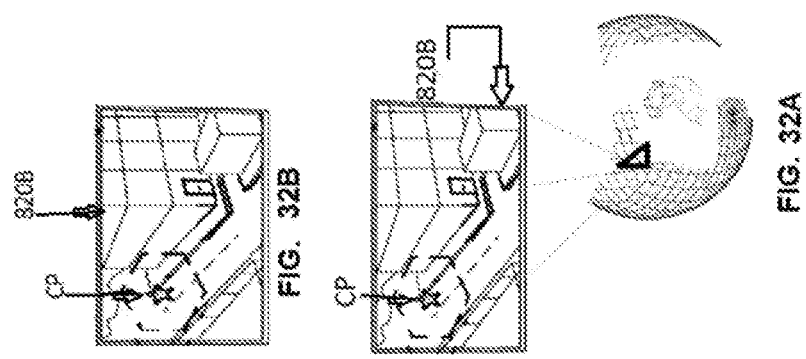
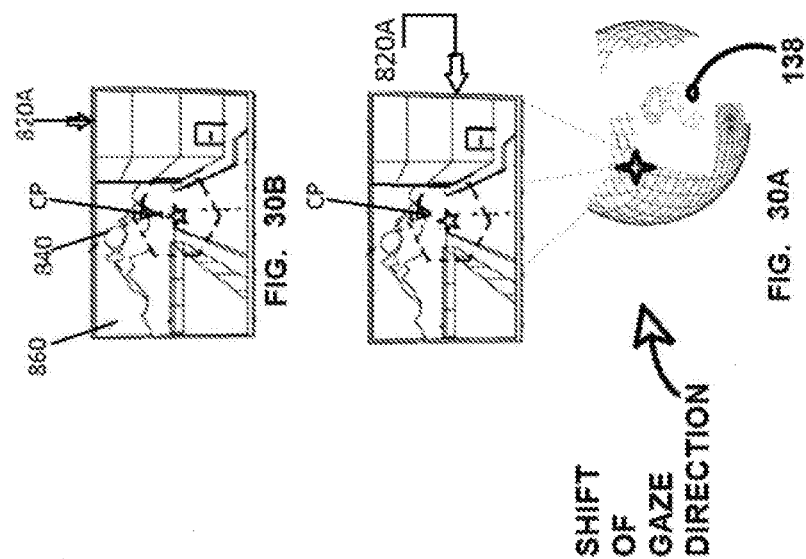

RIDE SYSTEM

RELATED APPLICATION

This application claims the benefit of and priority to U.S. Non-Provisional patent application Ser. No. 14/791,939, filed on Jul. 6, 2015, and entitled "Suspended Flying Rig System," which is a continuation-in-part of and claims priority to U.S. Non-Provisional patent application Ser. No. 14/324,935, filed on Jul. 7, 2014, and entitled "Suspended Flying Rig System," the disclosures of which are hereby incorporated by reference in their entirety.

FIELD OF THE INVENTION

The disclosure is generally related to a suspended and a non-suspended ride system. More particularly, the disclosure includes a system for positioning and orienting a ride vehicle, particularly within a working space.

BACKGROUND OF THE INVENTION

A motion providing device known in the art is a simulator-type apparatus that utilizes hydraulic cylinders to provide an upward force on a triangular support. The triangular support, in turn, typically supports a load. The cylinders provide force at angles which, when operating cooperatively, provide a range of motion for the support and the load mounted thereon. Other devices, such as hexapods and Stewart Platform devices, operate in a similar manner. However, these devices have a limited range of motion that is limited by the stroke of the hydraulic cylinder. Larger ranges of motion require larger hydraulic cylinders, which are expensive and more difficult to operate. In addition, hydraulic systems are expensive and require frequent maintenance.

Another motion-providing device includes suspended camera rigs wherein a camera is suspended from four cables at opposing corners of an area. The cables are drawn and retracted by winches to provide a motion of the camera. The motion of the camera by use of these cables is limited to (x, y, z-type) positioning within the space and cannot provide roll, pitch or yaw of the camera.

What is needed is a system and apparatus, such as a ride system and apparatus that provides a large range of positioning or orienting a load within a working space that does not suffer from the drawbacks of the prior art.

SUMMARY OF THE INVENTION

An aspect of embodiments of the present disclosure includes a suspended flying rig system for positioning and orienting a load support within a working space using an arrangement of cables.

Another aspect includes a suspended flying rig system including a plurality of cables attached to a load support releasably securing a load. In response to retraction and/or deployment of at least one of the plurality of cables, motion is provided generally within a three-dimensional working space to the load support. The motion includes at least six degrees of freedom.

A further aspect includes a suspended flying system including a plurality of cables attached to a load support releasably securing a load. The system includes at least three support structures, the support structure assembled to at least one winch assembly, each winch assembly for selectively retracting and/or deploying a corresponding cable of the plurality of cables. In response to retraction and/or deployment of at least one of the plurality of cables, motion is provided generally within a three-dimensional working space to the load support. The motion includes at least six degrees of freedom.

A further aspect includes a suspended flying rig system including a plurality of cables attached to a load support releasably securing a load. The system includes at least three support structures, each support structure assembled to at least one winch assembly, each winch assembly for selectively retracting and/or deploying a corresponding cable of the plurality of cables. At least one support structure is freestanding. In response to retraction and/or deployment of at least one of the plurality of cables, motion is provided generally within a three-dimensional working space to the load support. The motion includes at least six degrees of freedom. The load is selected from the group consisting of a ride vehicle and ride car.

A further aspect includes a ride system including a ride vehicle, the ride vehicle being operable to support a ride patron during a ride event during which the ride vehicle travels along an event path located within a volume. A display arrangement is provided for displaying a viewing script to the ride patron during a ride event, the viewing script having displayed content portions that are displayed for viewing by the ride patron. At a given reference instance during the travel of the ride vehicle along the event path when the orientation of the head of the ride patron relative to the ride vehicle is at a first given sight orientation. A first group of these displayed content portions are displayed within the instantaneous field of vision of the ride patron for viewing by the ride patron. At a second instance during the travel of the ride vehicle along the event path when the orientation of the head of the ride patron relative to the ride vehicle is at a second sight orientation different than the first given sight orientation, a second group of these displayed content portions are displayed within the instantaneous field of vision of the ride patron for viewing by the ride patron. A motive force assembly operatively connected to the ride vehicle, the motive force assembly being operable to provide at least one input of motive force to the ride vehicle that causes the ride vehicle to be propelled along at least one portion of the event path. A device is provided for detecting the status of a monitored property that varies in correspondence with a change in the orientation of the head of the ride patron relative to the ride vehicle. The status detecting device being operatively associated with the ride vehicle, the status detecting device having an initial orientation relative to the ride vehicle at the given reference instance during the travel of the ride vehicle along the event path such that the status detecting device detects an initial status of the monitored property, and the status detecting device either being in the initial orientation relative to the ride vehicle at the second instance during the travel of the ride vehicle along the event path or being at a variance from the initial orientation relative to the ride vehicle at the second instance during the travel of the ride vehicle along the event path. The orientations of the status detecting device at the first given instance and at the second instance during the travel of the ride vehicle along the event path being taken into account in connection with displaying the viewing script viewed by the ride patron during the ride event such that the first group of the displayed content portions of the viewing script are displayed within the instantaneous field of vision of the ride patron for viewing by the ride patron at the first given instance and the second group of the displayed content portions of the viewing script are displayed within the instantaneous field of vision of the ride patron for viewing by the ride patron at the second instance.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 30A, FIG. 30B, FIG. 32A, FIG. 32B, FIG. 34A, and FIG. 34B, each show a schematic view of a ride patron and the ride vehicle at a given instant during a ride event.

Wherever possible, the same reference numbers will be used throughout the drawings to represent the same parts.

DETAILED DESCRIPTION OF THE INVENTION

Provided is a suspended flying rig system for positioning and orienting a load support using an arrangement of cables. Also provided is a ride system. What follows are exemplary embodiments.

An advantage of embodiments of the present disclosure includes a capability of selective combination of movement of a load in the horizontal direction, vertical direction and the lateral direction permitting positioning and orientation in three dimensions within a three-dimensional working space, the load being releasably secured by a load support.

Another advantage of embodiments of the present disclosure includes capability of providing motion that allows pitching, yawing and rolling motion to a load support releasably securing a load.

Still another advantage of embodiments of the present disclosure includes the ability to assemble the flying rig system in a variety of locations, with little space requirements for equipment.

Yet another advantage of embodiments of the present disclosure includes a flying rig system requiring a minimum of non-usable ground space.

Another advantage of embodiments of the present disclosure includes an extrication device for delivering a load along one or more cables extending between a load support and a support structure, as an alternative to the flying rig system delivering the load to the ground or other location.

Another advantage of embodiments of the present disclosure include a ride system that shows the virtual vantage point that would be seen by a ride patron moving his/her head independently of a moving ride vehicle.

Still yet another advantage of embodiments of the present disclosure includes a flying rig system in which the load is releasably secured to one or more surfaces of the load support that are substantially vertically above and/or substantially vertically below other surfaces of the load support.

Figure 1:
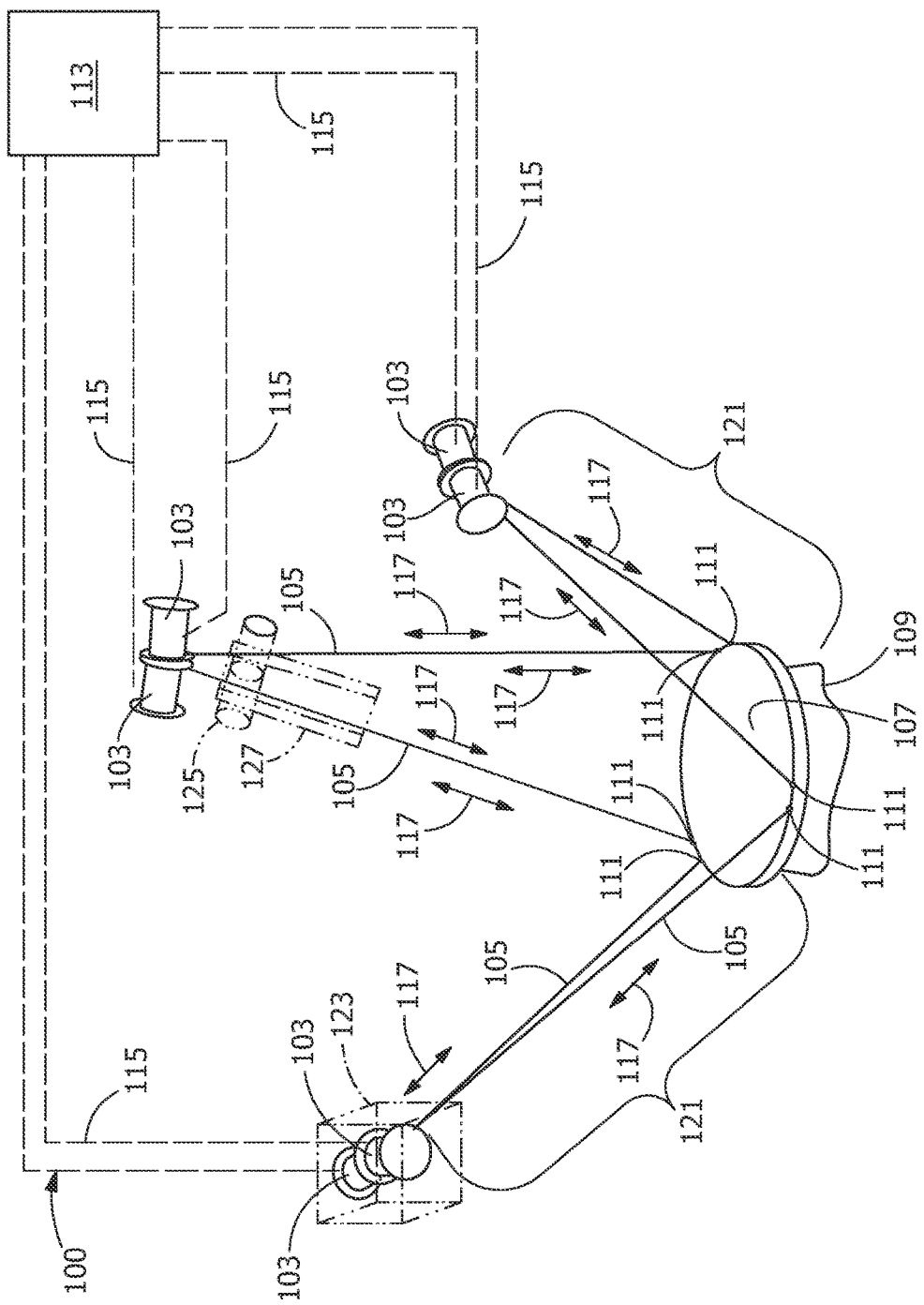
FIG. 1 shows an isometric view of a suspended flying rig system, according to an exemplary embodiment of the disclosure.
Figure 2:
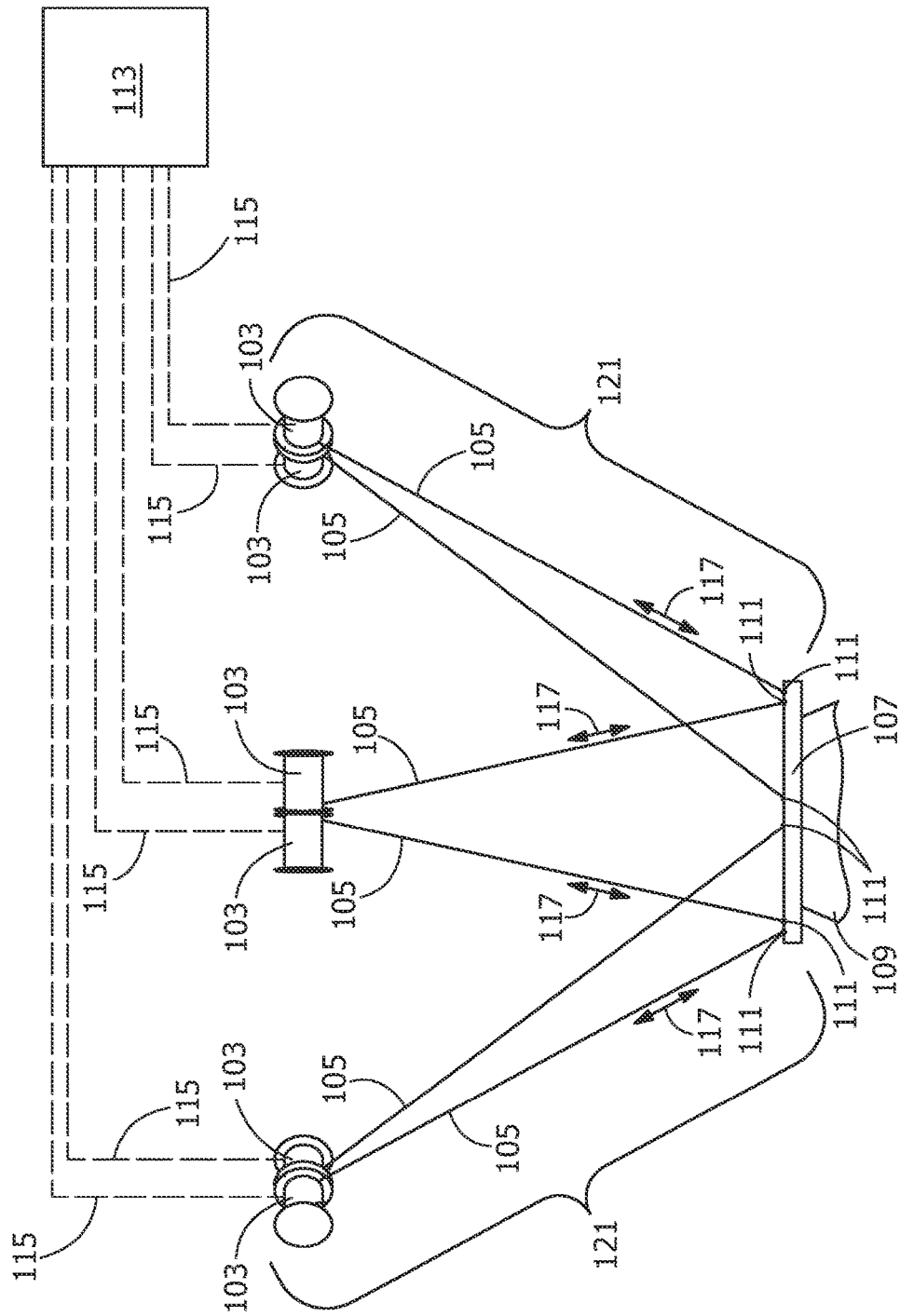
FIG. 2 shows a side view of a suspended flying rig system, according to an exemplary embodiment of the disclosure.
Figure 4:
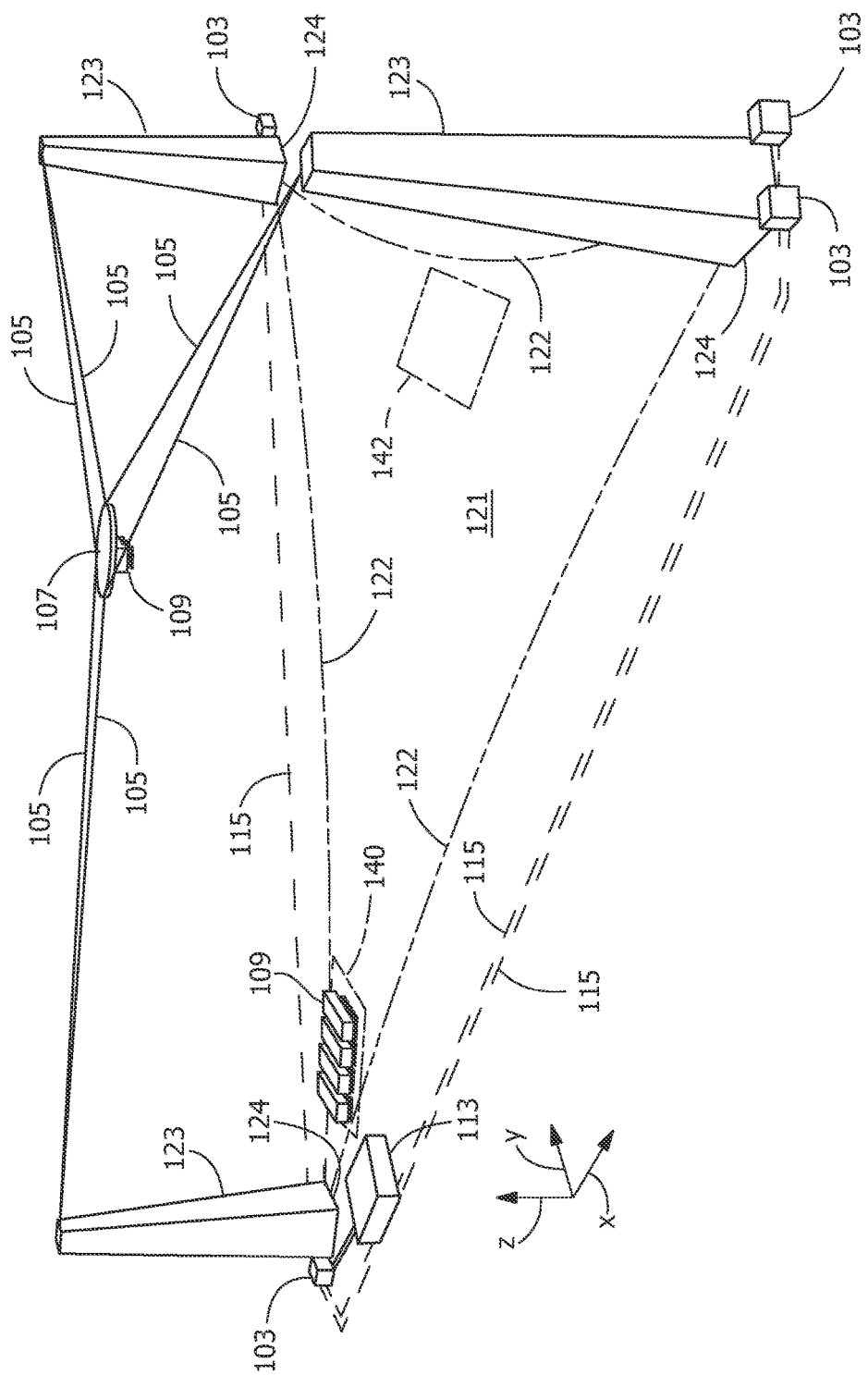
FIG. 4 shows an upper perspective view of a suspended flying rig system, according to an exemplary embodiment of the disclosure.

FIGS. 1-2 show a suspended flying rig system 100, according to an embodiment of the present disclosure. The flying rig system 100 may be mounted to any suitable support structure. For example, the plurality of winch assemblies 103 may be mounted to one or more support structures (a support structure 123 is shown in FIG. 1), such as a truss, ceiling structure, beam or other suitable support. In another embodiment, one or more support structures 123 may be freestanding structures (FIG. 4). The winch assemblies 103 are connected to the support structure by any suitable mechanism. Suitable mechanisms include, but are not limited to, fasteners, interlocking structures, quick-release mechanisms, semi-permanent attachment devices, such as welds, or other attachment devices. The flying rig system 100 also includes a plurality of cables 105 extending from each of the winch assemblies 103 to a load support 107.

The load support 107 carries, supports, attaches to or otherwise interacts with a load 109. In one embodiment, load support 107 releasably carries, supports, attaches to or otherwise interacts with load 109. For purposes herein, the term "securing", as in "releasably securing", is intended to include releasably carrying, supporting, attaching or otherwise interacting with load 109. In certain embodiments, the load may include seating and a protective cage or enclosure. However, the load 109 that is mountable on or to the load support 107 is not so limited. For example, other embodiments of the load may include cameras, equipment, lighting, personnel, ride vehicles, ride cars or other objects that are desirably positioned and/or oriented.

Load 109 may be mounted on a load support 107, which is moved by selective retraction and deployment of cable 105 from the plurality of winch assemblies 103. By retracted, retracting, retraction or grammatical variations thereof, it is meant that cable 105 is drawn so that the length of cable 105 suspended is shortened such as by a winch assembly 103. By deployed, deploying, deployment or grammatical variations thereof, it is meant that cable 105 is extended so that the length of cable 105 suspended is increased. The cable 105 is an elongate support device capable of supporting weight and being stored and driven on the winch assembly. Suitable structures for use as cable 105 include, but are not limited to, a wire, cable, rope, tape or other structure capable of supporting weight. The cable 105 may be synthetic or non-synthetic material. Suitable materials for cable 105 may be a metal, polymer or other suitable high strength material of construction. In other embodiments, the cable 105 includes power or signal wires either integrated into the cable 105, adjacent to the cable 105 or run parallel to the cable 105 in order to provide power and/or control to the camera or other devices present as the load 109. In one embodiment, one or more of the cables 105 are configured for transmitting signals (for example, through electrical signals) to the load support 107, particularly when power and/or control signals are desirable for use with the load support 107 or the load 109 on the load support. For example, in one embodiment, the cable(s) 105 include fiber-optic interiors with a durable exterior (for example, a flexible polymeric coating or a flexible metal coating). In one embodiment, one or more of the cables 105 includes an aramid fiber (for example, a polyimide fiber). In one embodiment, one or more of the cables 105 are steel cables. In another embodiment, one or more of the cables 105 are braided Kevlar-jacketed.

A suitable winch assembly 103 is a powered winch or other device capable of retaining and retracting/deploying cable. One embodiment of the disclosure includes a winch assembly 103 being a powered winch having a motor, which drives a reel or set of reels which receive, store, drive or otherwise move cable 105. The arrangement of motors and reel can include any suitable arrangement known for powered winches and may include gearing, clutch assemblies, brakes, belts, chains or other structures useful for translating rotation motion from the motor to rotational motion of the reel. In addition, the reel preferably includes a helical groove or similar structure to retain cable 105. Although the above has been described with respect to a motor and reel to move cable 105, other structures may be utilized to provide movement to cable 105. The amount or length of cable 105 that is suspended may be altered by other methods, such as a non-rotation mechanical system, hydraulic cylinders, or by other actuation devices capable of altering the amount of cable 105 that is suspended. For example, portions of the cable 105 may be folded or redirected to remove a portion of the length that is suspended from the support structure onto which the winch assemblies 103 are attached. Manipulation of the length of cable 105 suspended facilitates motion of the load support attached thereto.

Winch assemblies 103 are controlled by a controller 113 or control system. A suitable controller 113 or control system includes one or more microprocessors and graphical user interface that provides individual control to winch assemblies in response to the desired motion of load support 107. Control lines 115 provide signals and/or power to the winch assemblies. In one embodiment, the winch assemblies 103 include control systems having microprocessors that provide control to the winch assembly 103 and retract or deploy the cable 105 in response to a signal. In another embodiment, the winch assemblies 103 may receive power and/or signals from controller 113 to retract or deploy the cable 105. The arrangement of control lines 115 may include individually run cables to the winch assemblies (as shown in FIG. 1) or may include a daisy-chain arrangement wherein the line includes a single or few branches from which connections to the winch assemblies 103 are made (see e.g., FIG. 2). The arrangement of the controller 113 may also be integrated into a large control system, such as a show or attraction, where a graphical user interface and series of microprocessors are arranged to provide centralized control of the motion of load support 107.

While the above has been described with respect to winch assemblies 103 being attached to the support structures, such as trusses, other structures may be utilized to guide and suspend cables 105. In another embodiment, one or more pulleys (one set of pulleys 125 is shown in FIG. 1) may be mounted to a single support structure. The pulleys may be arranged and mounted to support the cable 105 as it is deployed or retracted by winch assembly 103. In another embodiment, the pulleys may be arranged within or on tracks or other guides (one set of tracks/guides 127 is shown in FIG. 1) that physically move the pulleys to different locations on the fly to provide dynamic re-sizing and re-shaping of the working space 121. Suitable pulleys include conventional pulley structures or other devices capable of rollably or slidably supporting a cable, wire or rope. While the pulleys in this embodiment are preferably free-rolling pulleys, a brake, motor or other rotation facilitating or retarding device may be provided to pulleys to provide additional control for positioning the load support 107. In these embodiments, the winch assembly 103 may be located at a location some distance from the pulley. In one embodiment, the winch assemblies 103 are located at ground level. In another embodiment, a portion of the winch assemblies 103 are mounted at ground level and a portion of the winch assemblies are mounted on a support structure and cables 105 extend to the pulleys. In yet another embodiment, the winch assemblies 103 are consolidated into a single location and cables 105 extend to the pulleys to allow shorter control lines 115 and easier servicing of the winch assemblies 103. The cable 105 is connected to the attachment points 111 on load support 107 by any suitable mechanism. Suitable mechanisms include, but are not limited to, loop and closed-hook mechanisms, connectors guided by magnets for alignment, bolts or other fasteners, and cable splices.

Motion of the load support 107 is facilitated by deploying or retracting cables 105 along pull directions 117. Motions, such as pitch, roll and yaw, can be provided by selectively retracting and deploying cable 105 with winch assembly 103. The motions result as the cables 105 are independently deployed or retracted, causing independent motion in each of the pull directions. The cooperative motion in the pull directions permit a range of motion in a three-dimensional space with at least six degrees of freedom. Other motions, such as lifting, can be accomplished by selectively retracting cable 105 with winch assembly 103. As shown in FIGS. 1-2, the load support 107 can be positioned and oriented, generally within working space 121. Working space 121 includes a three-dimensional space or three-dimensional working space through which the load support 107 may be positioned and oriented. Although FIGS. 1-2 depict a general dimension for the working space, the disclosure is not limited to the locations shown in the figures and movement, positioning and orientation may occur outside the working space 121, i.e., motion is provided generally within a three-dimensional working space 121, particularly if external forces are provided or actions, such as swinging or cable manipulation, are utilized. In addition, the dimensions of working space 121 may be altered, for example, by placement of pulleys, movement of the support structure or movement of the winch assemblies.

In an exemplary embodiment, the support structure may be mounted on rails or other movable assembly and configured to provide additional translational motion to the load support 107. For example, the working space 121 may be extended in this embodiment to include an extended space corresponding to the motion of the support structure. Likewise, the support structure may be rotated, lifted, lowered or otherwise moved to provide an additional range of motion to the load support 107 and an extension to the working space.

Figure 3:
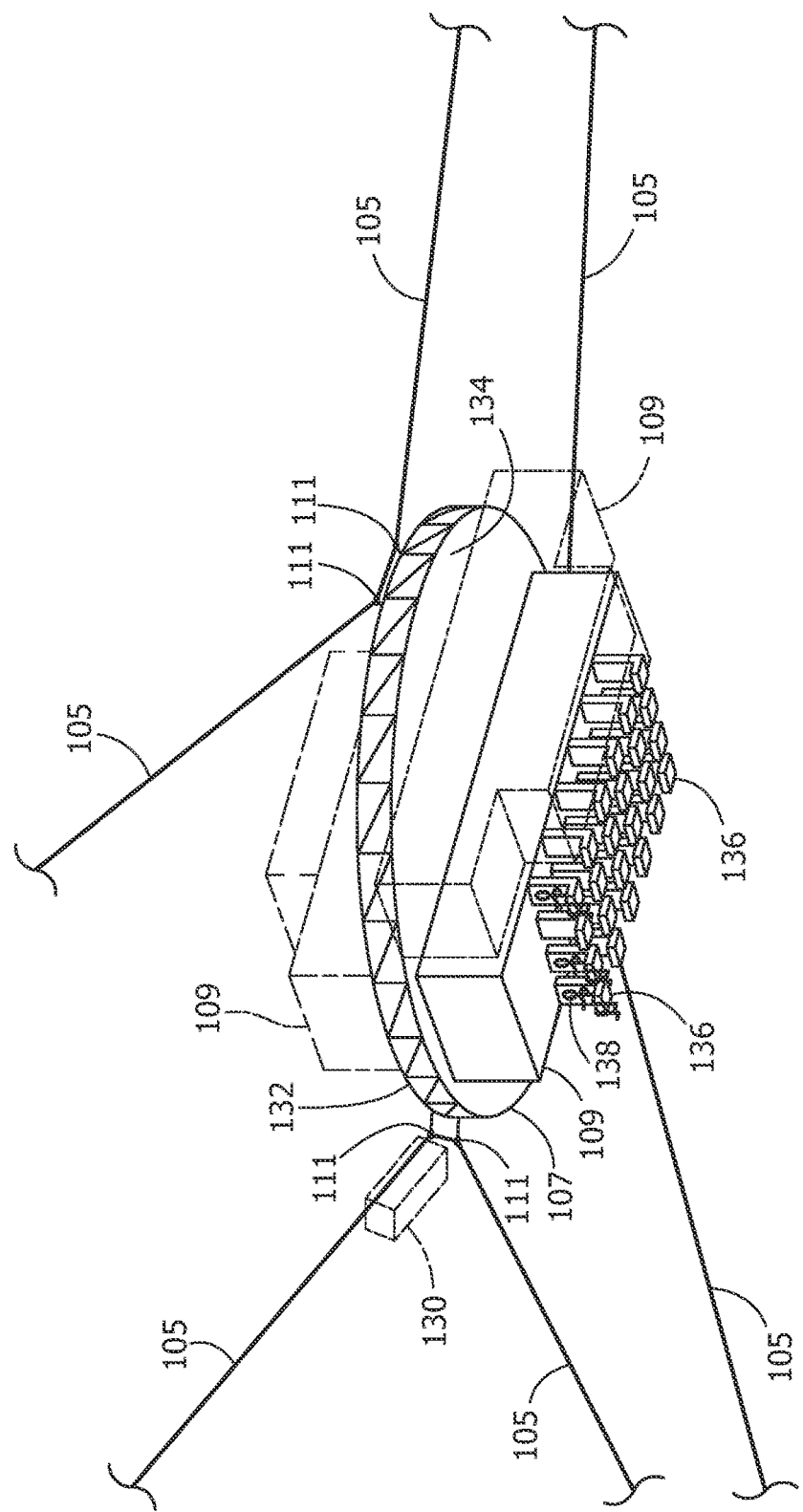
FIG. 3 shows an enlarged, partial lower perspective view of a suspended flying rig system, according to an exemplary embodiment of the disclosure.

FIG. 3 shows a lower perspective view of an exemplary embodiment of the load 109 as a ride vehicle or ride car. FIG. 3 shows the load 109 including a plurality of securing arrangements 136 such as chairs for moving ride patrons or riders 138 within a three-dimensional working space 121 (see e.g., FIGS. 4 and 5) defined by interconnected boundary lines 122 extending in the x-y plane, the interconnected boundary lines movable in the z direction to collectively form the three-dimensional working space. In one embodiment, securing arrangements 136 may be configured for non-human riders. In another embodiment, securing arrangements may be configured for cargo. Load 109 as a ride vehicle or ride car optionally includes a protective enclosure or cage (not shown) that may be at least partially transparent to enhance viewability. As further shown in FIG. 3, load 109 is releasably secured to one or both of surfaces 132, 134 of load support 107. As shown in FIG. 3, the surface 132 to which a load 109 is releasably secured, is positioned at least substantially vertically above other surfaces of load support 107 when the load support is positioned substantially horizontally (see e.g., FIG. 4), while surface 134 to which a load 109 is also releasably secured, is positioned at least substantially vertically below other surfaces of load support 107 when the load support is positioned substantially horizontally (see e.g., FIG. 4). Although the loads may be releasably secured to other than opposed surfaces 132, 134, and other orientations of the load support may be utilized while the load support is moving through the three-dimensional working space 121, such as when the system is utilized as a "thrill ride" (i.e., changing load support orientations), when the system is utilized for purposes of viewing the environment surrounding the system, it may be desirable to position the load (including riders in ride vehicles or ride cars) such as to maximize the riders' viewing experience (i.e., maximize the riders' unobscured and/or peripheral vantage point). In one embodiment (not shown) the securing arrangements 136 may be constructed such that riders' bodies can be maintained in a position that is substantially parallel to the corresponding surface of the load support to which the load is secured, thereby providing a vantage point that is substantially perpendicular to the corresponding surface of the load support. In one embodiment, the loads may be releasably secured to surfaces 132, 134 simultaneously. For example, once load support 107 is lowered to a desired docking position, a surface of the load support 107, such as surface 134, is either brought into abutment with a corresponding surface of load 109 such that load 109 may be releasably secured, or surface 134 is placed in a position such that load 109 can be moved in sufficiently close proximity such that load 109 may be releasably secured to the load support. In one embodiment, such as shown in FIG. 3, loads 109 are releasably secured to each of surfaces 132, 134.

As shown in FIG. 3, an extrication device 130, such as a self-propelled winch assembly, secured to a cable 105 permits the load, such as a rider 138 or cargo, to be delivered from a ride vehicle/ride car along the cable extending between the load support 107 and a support structure 123. Such an extrication for removal device may be required in the event of a malfunction associated with deployment/retraction of the cables, resulting in an inability to move load support 107 from an elevated position in the three-dimensional working space 121 from which extraction of the riders from the ground or from the air cannot be achieved. In one embodiment, in which human riders must be rescued or extracted from the ride vehicle/ride car, one or more extrication devices 130 may be required, which may involve rescue personnel being transported from a support structure to the load support, and also including additional equipment (not shown), such as, but not limited to, straps, harnesses, clips and devices for unlocking ride vehicles/ride cars, such as for access to the riders or to disengage one or more of the ride vehicles/ride cars from the load support, and providing sufficient redundancy loading arrangements required so as to comply with applicable safety specifications and/or codes. In one embodiment, portions of the ride vehicle/ride cars containing one or more riders may be removable from the load support without requiring riders to be individually removed or extracted from the ride vehicles/ride cars. Additionally, in one embodiment, features associated with the support structures, such as enclosed steps or elevators accessible from the ground, that are also in compliance with such safety specifications and/or codes, may be incorporated into the flying rig system.

In one embodiment of load support 107, at least one or both of surfaces 132, 134 are configured to interchangeably and selectably receive/secure loads 109, such as a ride vehicle or ride car. In another embodiment, at least surface 134 of load support 107, as shown in FIG. 3, is configured to releasably receive/secure more than one load 109 (i.e., more than one ride vehicle or ride car).

Figure 5:
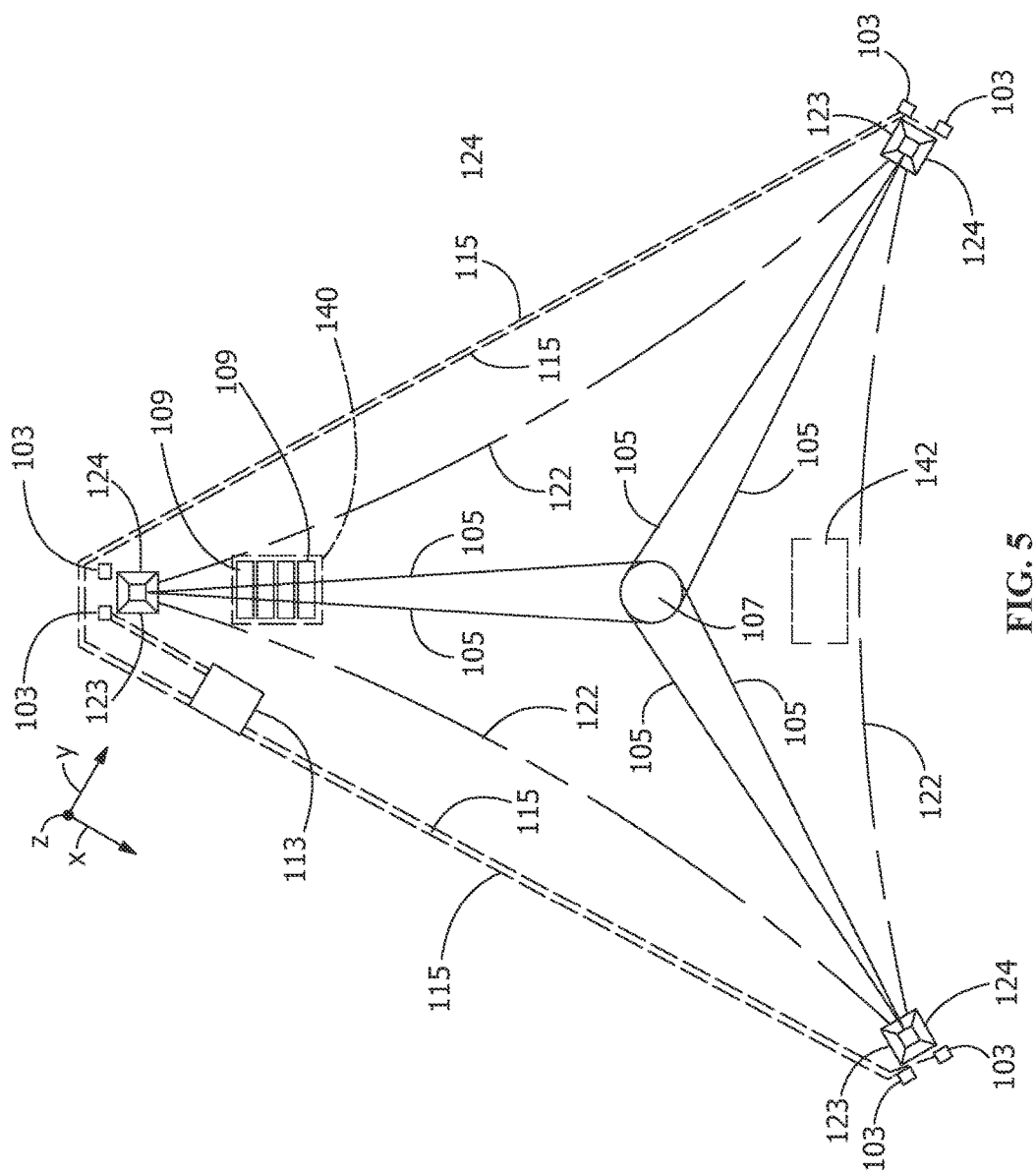
FIG. 5 shows a plan view of a suspended flying rig system, according to an exemplary embodiment of the disclosure.

As shown in FIGS. 4 and 5, the system may be used to move the loads 109, such as ride vehicles or ride cars, within the three-dimensional working space 121. In one movement path, load 109 is moved from a first position 140 into three-dimensional space, returning to first position 140. In one embodiment, this movement path may correspond to the system being used as an amusement park ride, in which the starting point and ending point of the ride (and the loads) are the same. In another movement path, load 109 is moved from the first position 140 into the three-dimensional working space 121 to a second position 142. In one embodiment, this movement path may correspond to the system being used to transport riders, for example, from a parking lot collection area to the entrance of an amusement park. In another embodiment, this movement path may correspond to transporting riders in a congested urban setting, e.g., from a hotel to an entertainment/dining venue (or vice versa), providing a scenic view of the city between departure and destination points, without the aggravation of traffic. In another embodiment, this movement path may correspond to movement of the load 109 over a waterway or other obstacle preventing conventional overland travel, such as by automobile. In other embodiments, this movement path may correspond to different combinations of vehicles/vessels and/or land-based positions, such as between two (or more) different sea vessels, between one or more land-based position(s) and a sea vessel(s), between one or more land-based position(s) and a flying vehicle(s), such as a hovercraft, helicopter, blimp or other air vehicle capable of independently controlling its position in space (as well as air vehicles incapable of independently controlling its position in space, such as a hot air balloon), between one or more sea vessel(s) and a flying vehicle(s), between one or more land-based position(s), a sea vessel(s) and a flying vehicle (s), or any combination thereof. In one embodiment, the loads may include the movement or transfer of riders and/or cargo, or for rescue missions, such as extracting riders and/or cargo from a land-based position, or from a body of water, or from a flying vehicle. In order for the system to operate as disclosed between only two vehicles/positions, at least one of the vehicles/positions would need to include at least two support structures, such as previously discussed.

Figure 6:
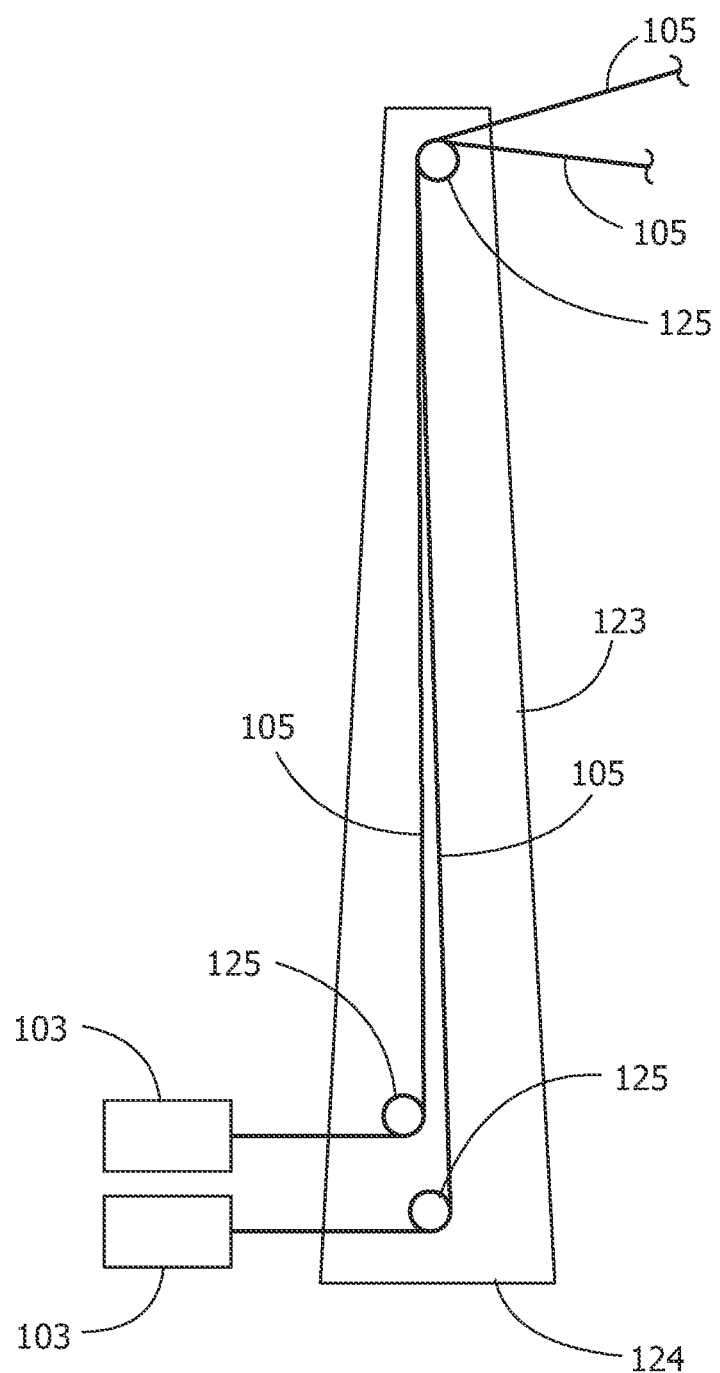
FIG. 6 schematically shows a portion of a suspended flying rig system, according to an exemplary embodiment of the disclosure.
Figure 7:
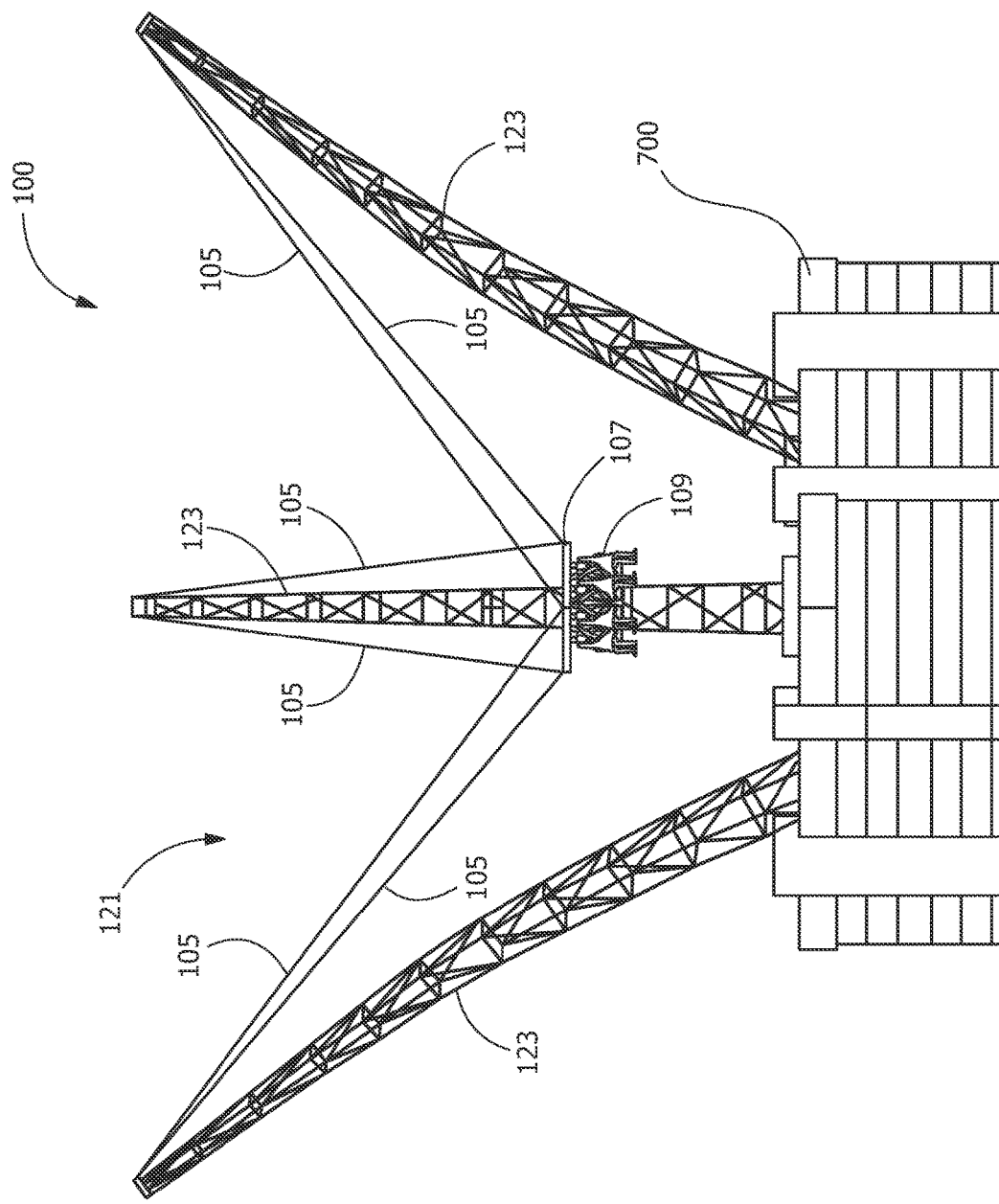
FIG. 7 shows a side view of a suspended flying rig system, according to another exemplary embodiment of the disclosure.

As further shown in FIGS. 4-6, the three support structures 123 are freestanding. In another embodiment, none of the support structures 123 may be freestanding. In other embodiments, one or more of the support structures 123 may be freestanding. For purposes herein, "freestanding", as in "freestanding structure", is intended to mean a structure that is not supported by another object. The term object is intended to include another freestanding structure. That is, a tower that may include one or more support cables is a freestanding structure. Additionally, a mass sufficiently protruding or jutting from the surrounding terrain (erected or natural formation) securable to an upper pulley 125 (FIG. 6) or winch 103 from which cable 105 may be deployed or retracted for use with the system as previously discussed, may be considered a freestanding structure. The support structures 123, such as the towers shown in FIGS. 4-6, are examples of freestanding structures.

FIGS. 4-6 show a flying rig system requiring a minimum of non-usable ground space. That is, as shown, only the collective cross-sectional areas 124 or combined footprint of support structures 123 are permanent, and thus non-usable for other purposes. For purposes herein, the term footprint is intended to mean the cross-sectional area of a non-movable object supported by the ground or in sufficiently close proximity with the ground as to prevent usage of the ground for purposes. It is to be understood that for pulleys 125 or winch assemblies 103 (FIG. 1) that are secured to existing structures, in practical effect, there is little, if any, additional loss of usable ground space as a result of the flying rig system. This resulting ground space savings is due to the existing structure being utilized for supporting the flying rig system. That is, the existing structures are already occupying essentially the same ground space as that occupied prior to installation of the flying rig system, especially if the components of the flying rig system are mounted sufficiently vertically above the ground so as not to interfere with the ground in close proximity to the existing structure being used for other purposes. It is to be understood that naturally occurring freestanding structures, such as masses protruding or jutting from the surrounding terrain (ground) similarly represent ground space that would already be considered non-usable for other purposes. The same reasoning (non-usable for other purposes) would be applicable for support structure forming a portion of a sheer cliff or other geological feature that may otherwise not be considered to be "freestanding". In summary, due to the minimum combined footprint associated with the support structure of the flying rig system of the present disclosure, the flying rig of the present disclosure provides maximum flexibility for multiple uses of the ground not related to the flying rig.

In summary, the only non-usable ground space of the flying rig system is essentially that associated with the combined footprint of the support structures, since ground space associated with dropping off and/or picking up the loads prior to movement in the three-dimensional space, such as first position 140 and second position 142 (FIGS. 4 and 5), are not required to be permanently fixed positions that would render the ground space associated with those positions non-usable for other purposes.

FIGS. 7-12 show a suspended flying rig system 100, according to another embodiment of the present disclosure. In this embodiment, the suspended flying rig system 100 is mounted to building structure 700 and is arranged to move load 109. Load 109 is supported and moved by load support 107 by cables 105. Although building structure 700 is shown a high-rise building in an urban setting, any suitable building structure in any suitable setting may be utilized. For example, structures to which the suspended flying rig system 100 is mounted may be permanent, portable, and/or mobile and may be utilized in an outdoor or indoor setting.

As shown in FIGS. 7-12, support structures 123 extend from building structure 700 in a plurality of directions. The support structures 123 are arranged to provide a desirable space in which to move load 109. In one embodiment, the support structures include the arrangement generally shown in FIG. 6 with winch assemblies at the base and cables 105 being fed through a pulley at a distal end. Although FIGS. 7-12 show the suspended flying rig system 100 with support structures mounted on a single building structure 700, the support structures may be on two or more building structures 700 and support load 109 therebetween. As discussed with respect to FIGS. 1-6, motion of the load support 107 is facilitated by deploying or retracting cables 105. The motions result as the cables 105 are independently deployed or retracted, causing independent motion in each of the pull directions (see FIGS. 1-2). The cooperative motion in the pull directions permits a range of motion in a three-dimensional space with at least six degrees of freedom. As in FIGS. 1-2, the load support 107 can be positioned and oriented, generally within working space 121.

Figure 8:
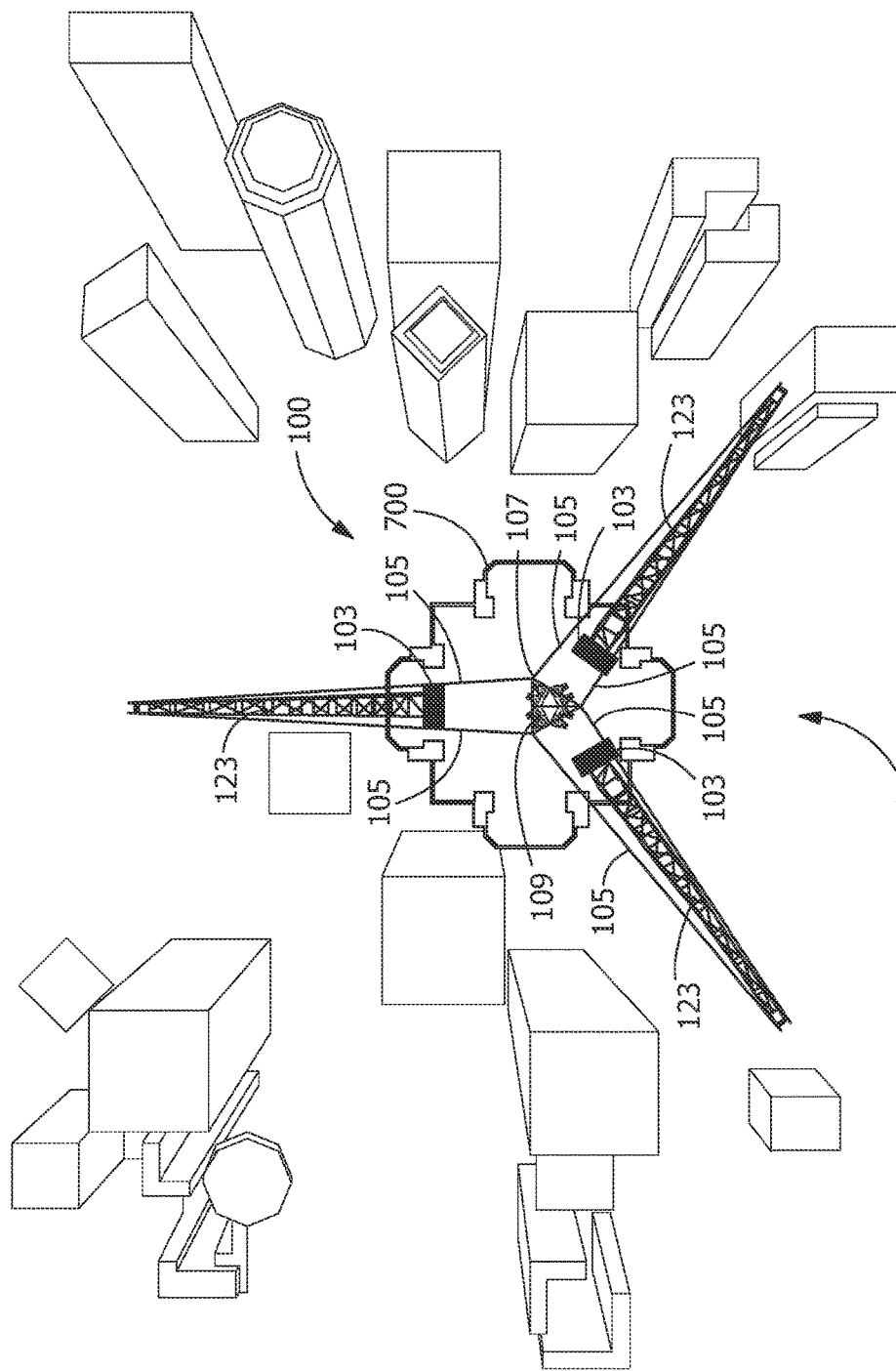
FIG. 8 shows a top view of the suspended flying rig system of FIG. 7.
Figure 9:
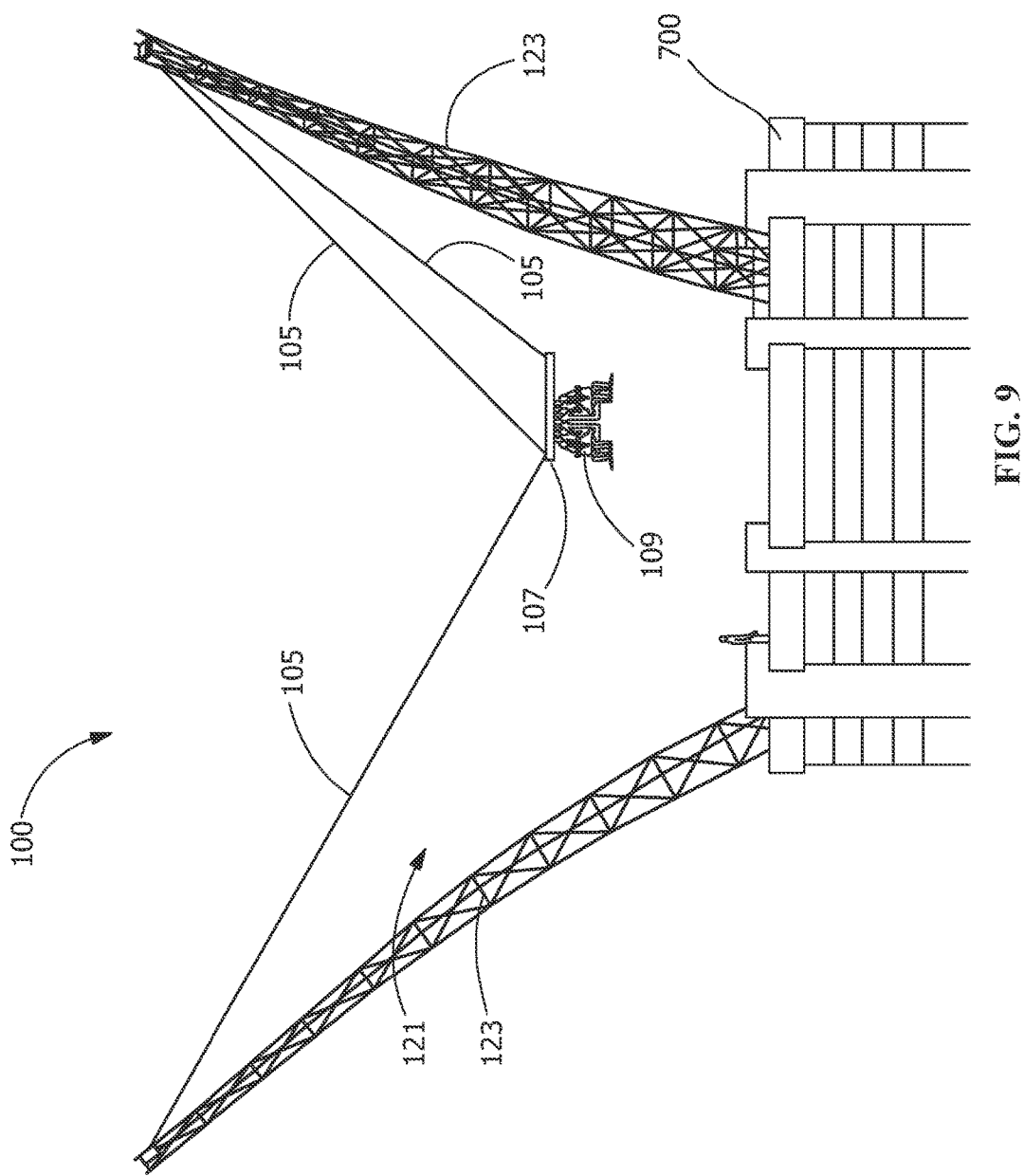
FIG. 9 shows an alternate side view of a suspended flying rig system, according to FIG. 7.
Figure 10:
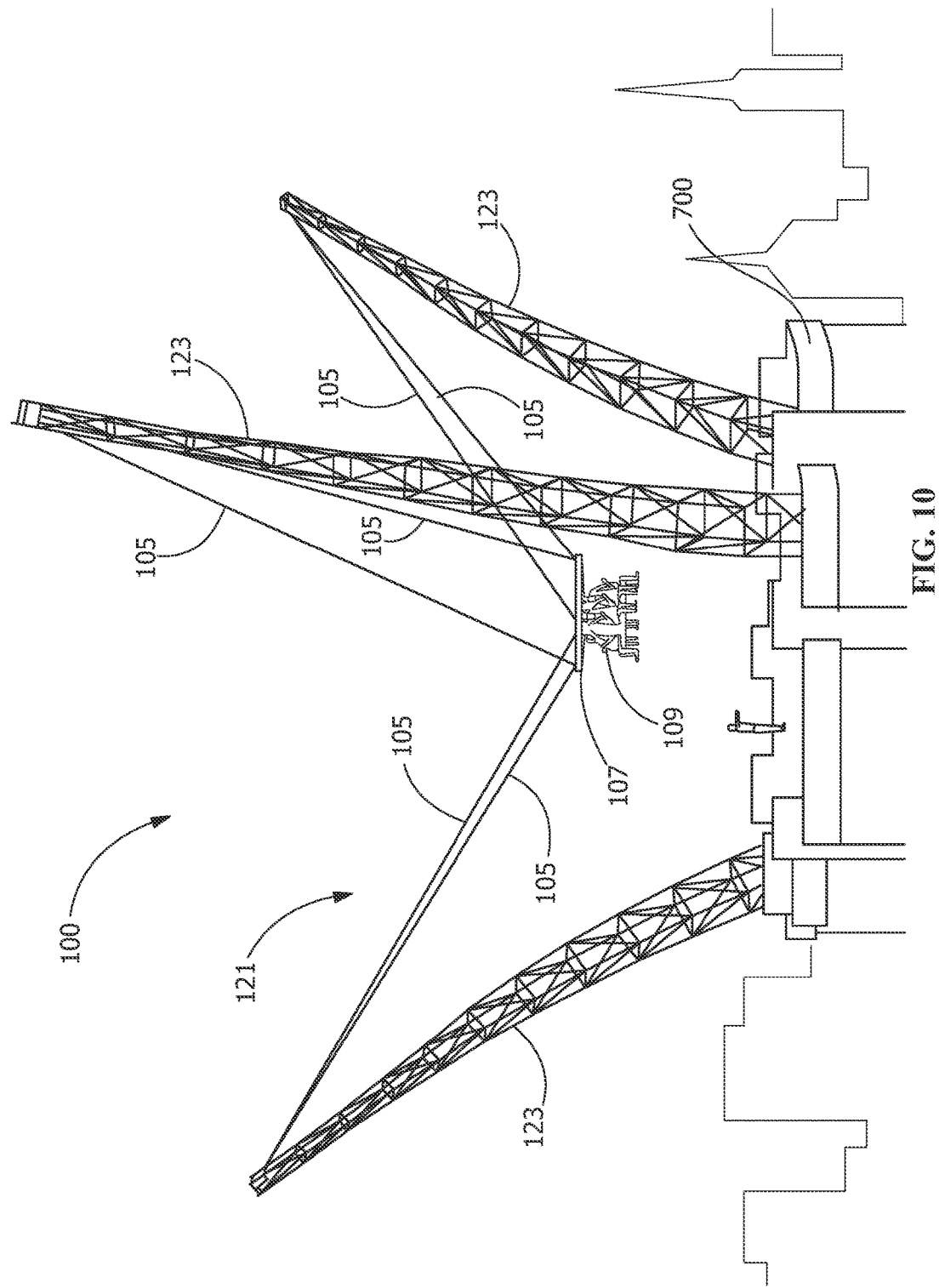
FIG. 10 shows an alternate side view of a suspended flying rig system, according to FIG. 7.
Figure 11:
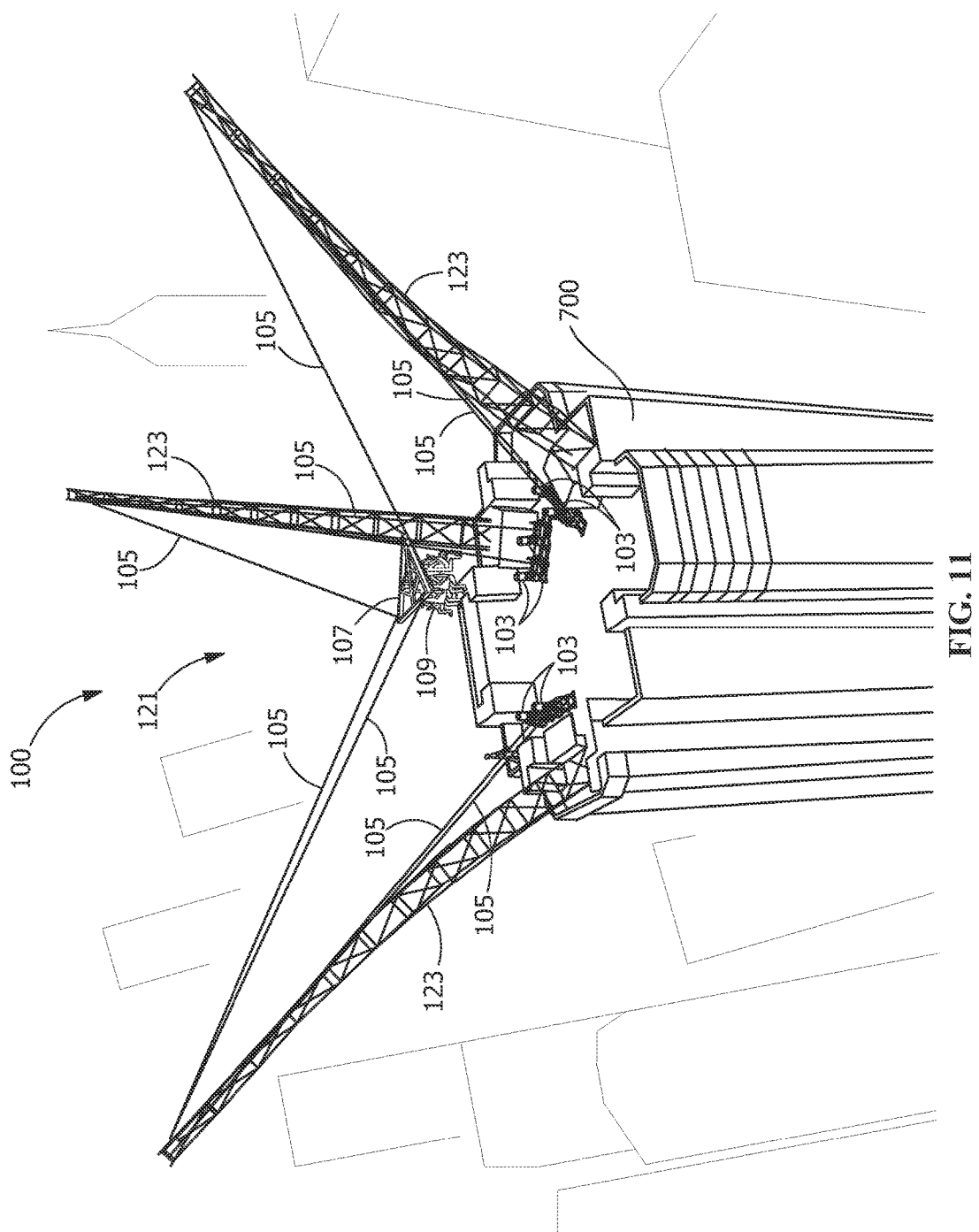
FIG. 11 shows a perspective view of a suspended flying rig system, according to FIG. 7.
Figure 12:
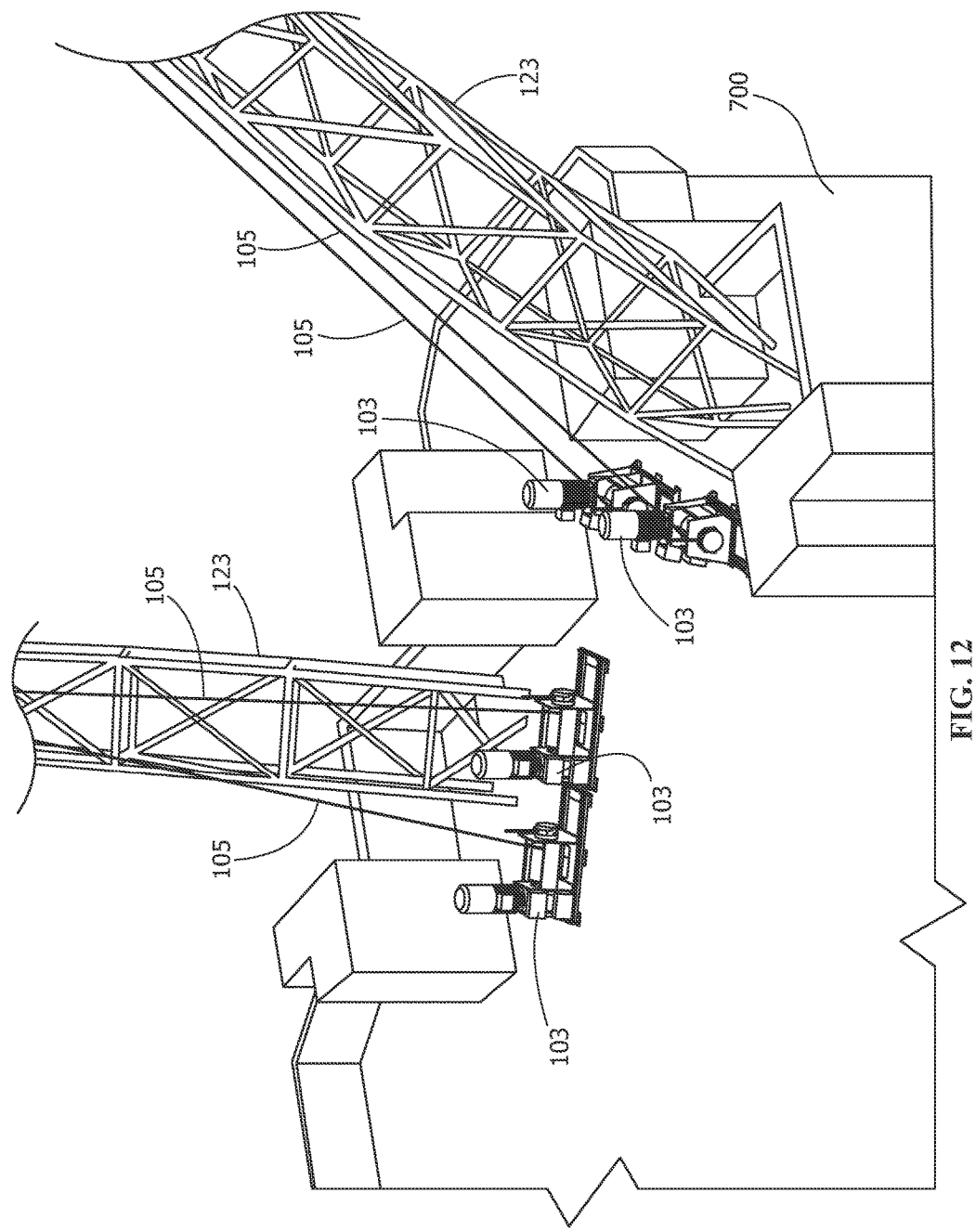
FIG. 12 shows an enlarged view of a portion of the suspended flying rig system, according to FIG. 7.

As shown in FIGS. 8, 11 and 12, the deployment of cables 105 are accomplished by winch assemblies 103. As shown in FIGS. 8, 11 and 12, the winch assemblies 103 are mounted on building structure 700, but are not so limited. Other mounting locations for the winch assemblies 103 include any suitable location for providing support and deployment of cable 105, including, but not limited to, in, on or in close proximity to support structures 123. As shown best in FIG. 12, the winch assemblies 103 include two winch assemblies 103 for each support structure 123. Other arrangements of winch assemblies 103 may be utilized, provided that the cables 105 are controlled to provide the desired motion of the load support 107.

Figure 13:
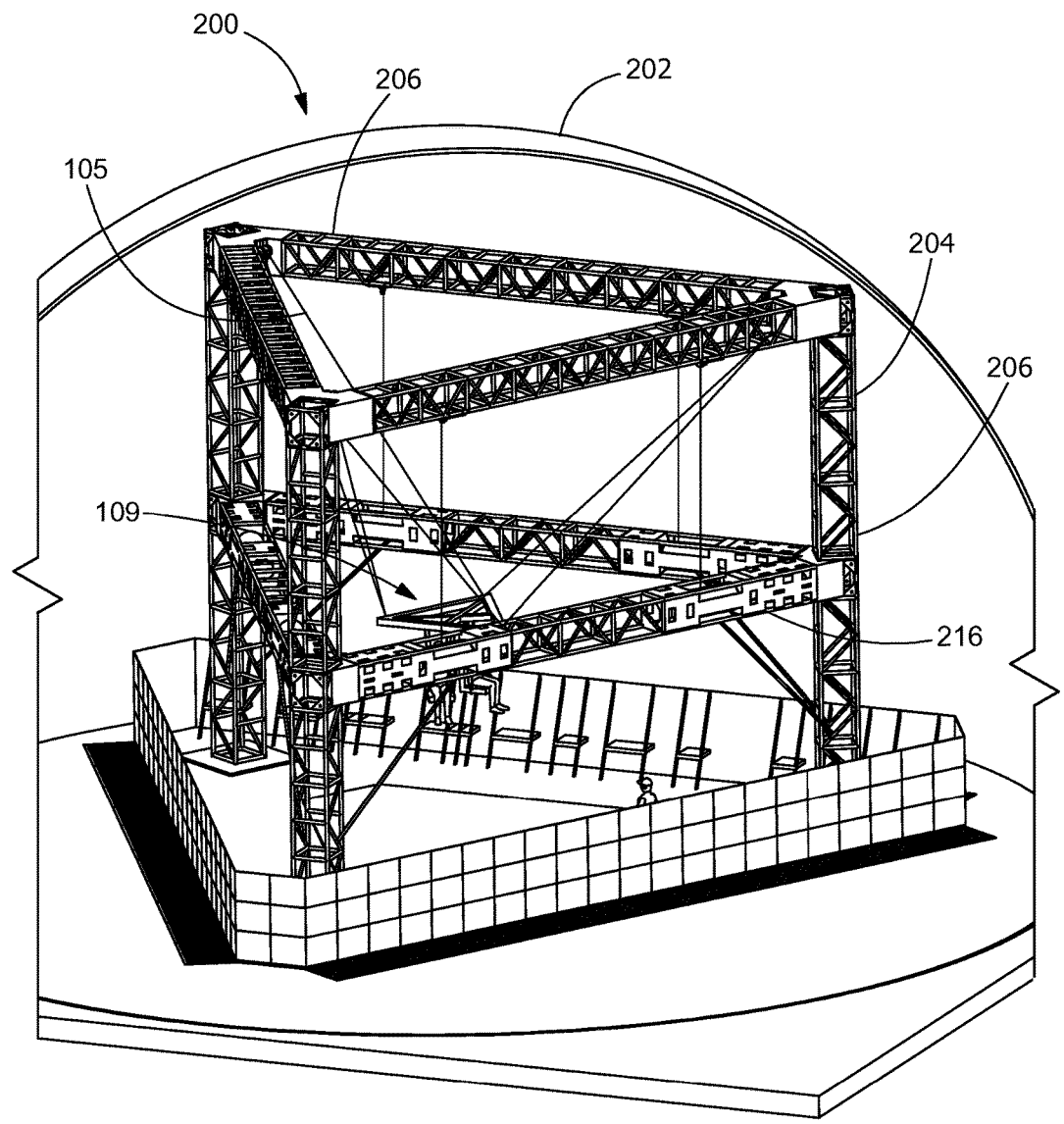
FIG. 13 shows an upper perspective view of an exemplary ride system.
Figure 14:
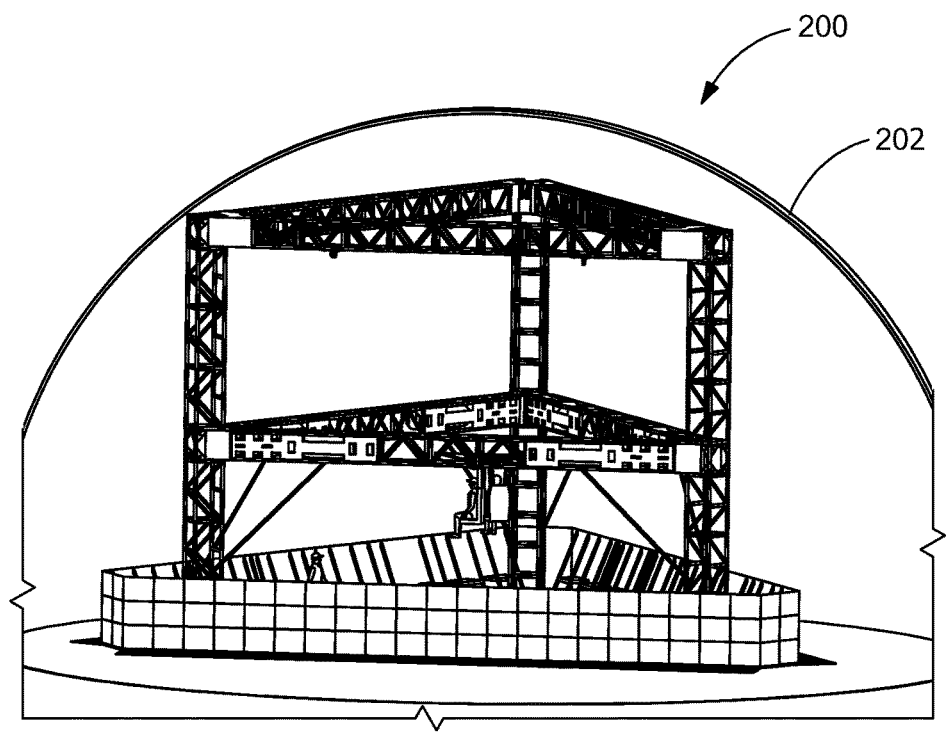
FIG. 14 shows a lower perspective view of the ride system of FIG. 13.
Figure 15:
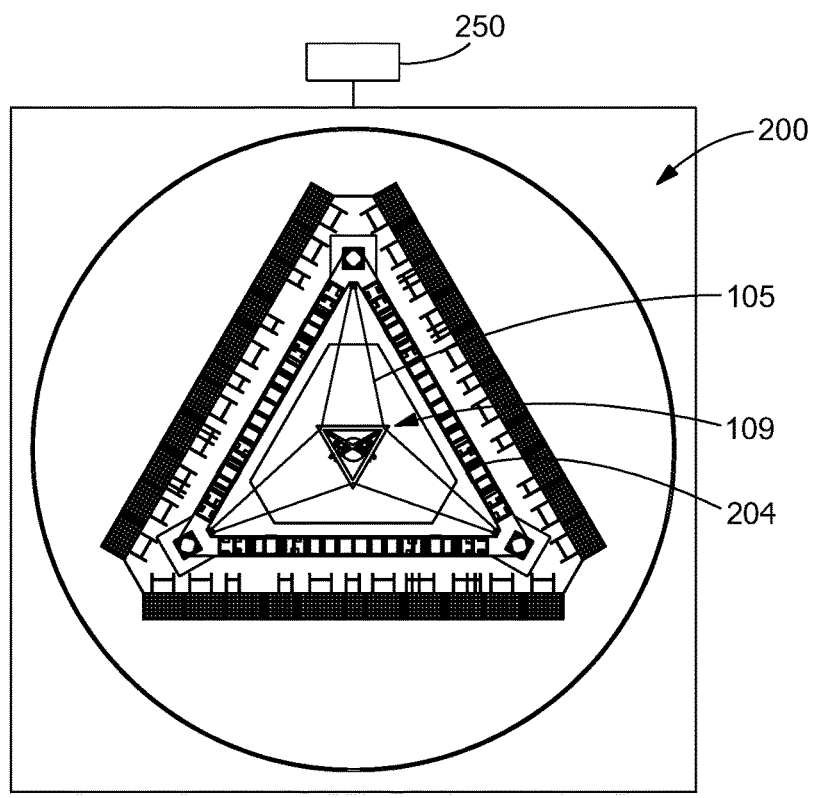
FIG. 15 shows a plan view of the ride system of FIG. 13.
Figure 16:
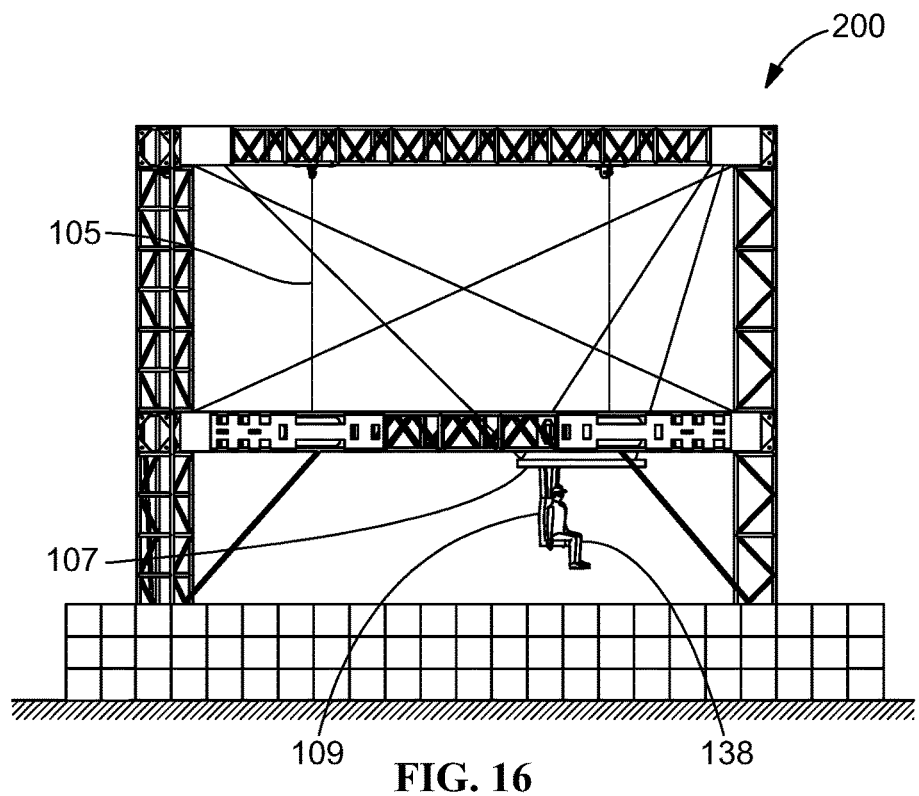
FIG. 16 shows a side elevation view of the ride system of FIG. 13.
Figure 17:
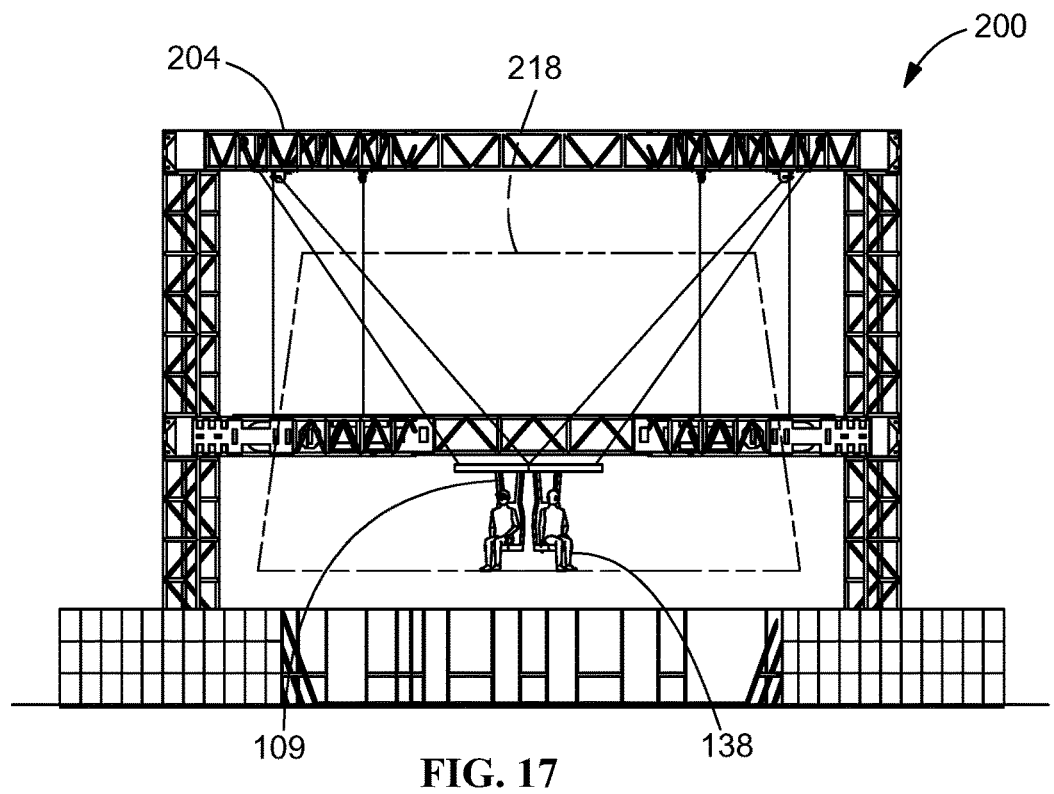
FIG. 17 shows a front elevation view of the ride system of FIG. 13.
Figure 18:
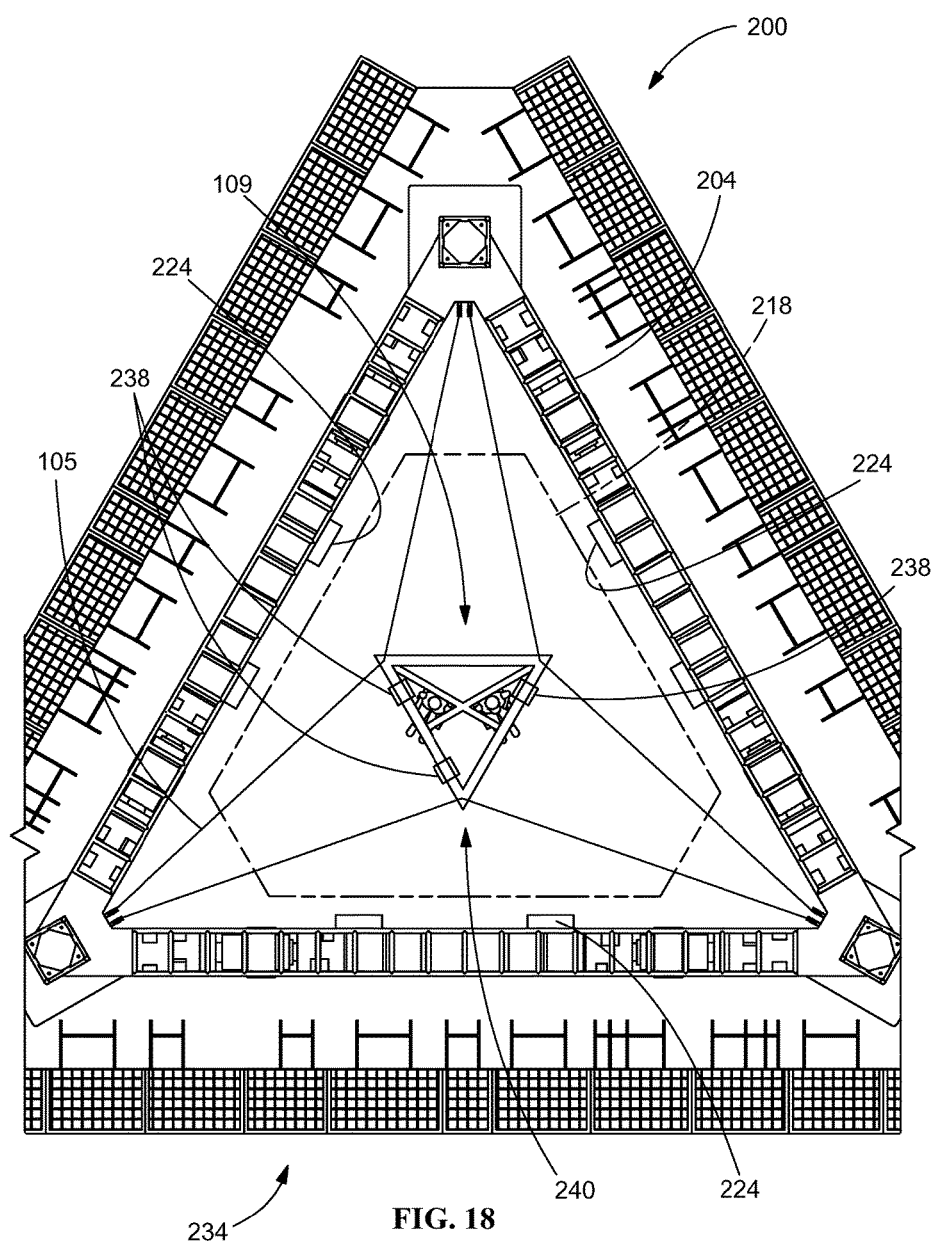
FIG. 18 shows an enlarged, partial plan view of the ride system of FIG. 13.
Figure 19:
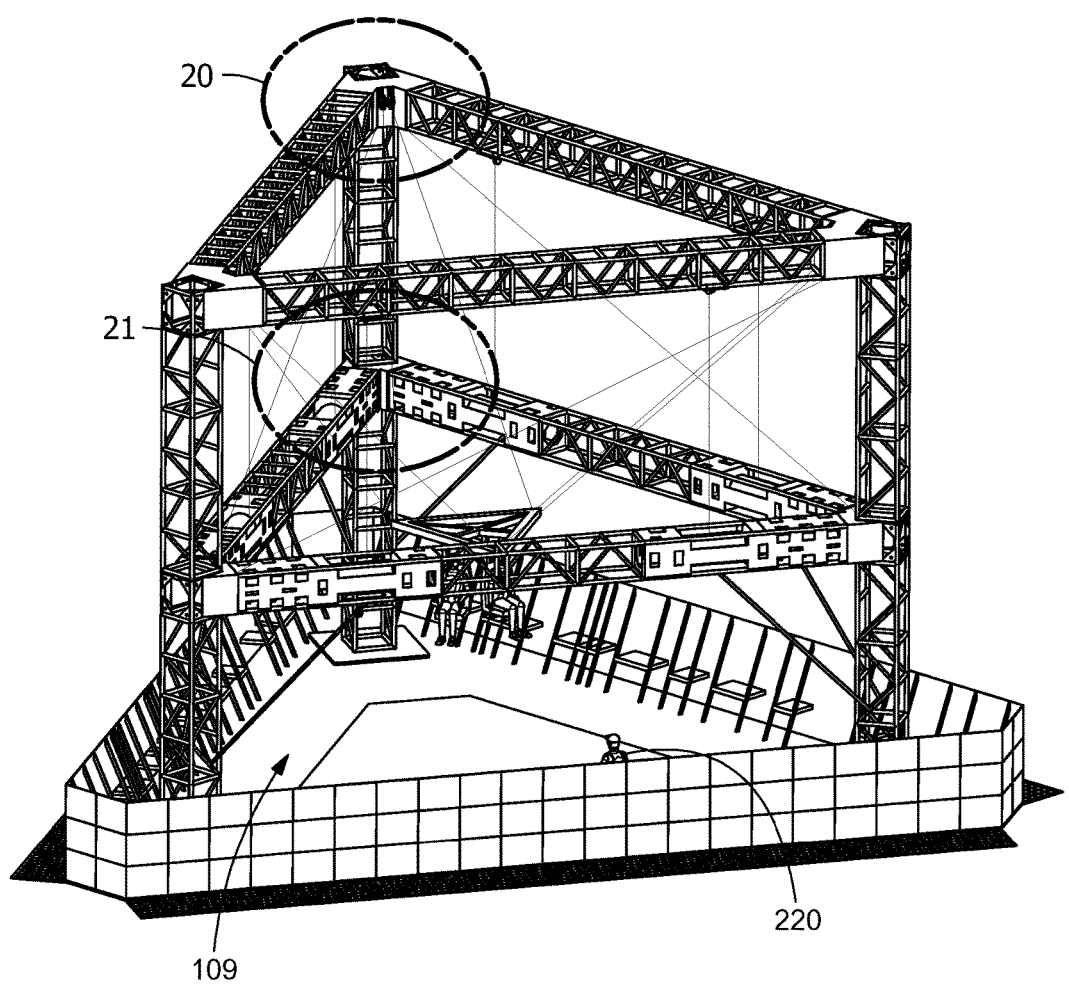
FIG. 19 shows an enlarged upper perspective view of the ride system of FIG. 13.
Figure 20:
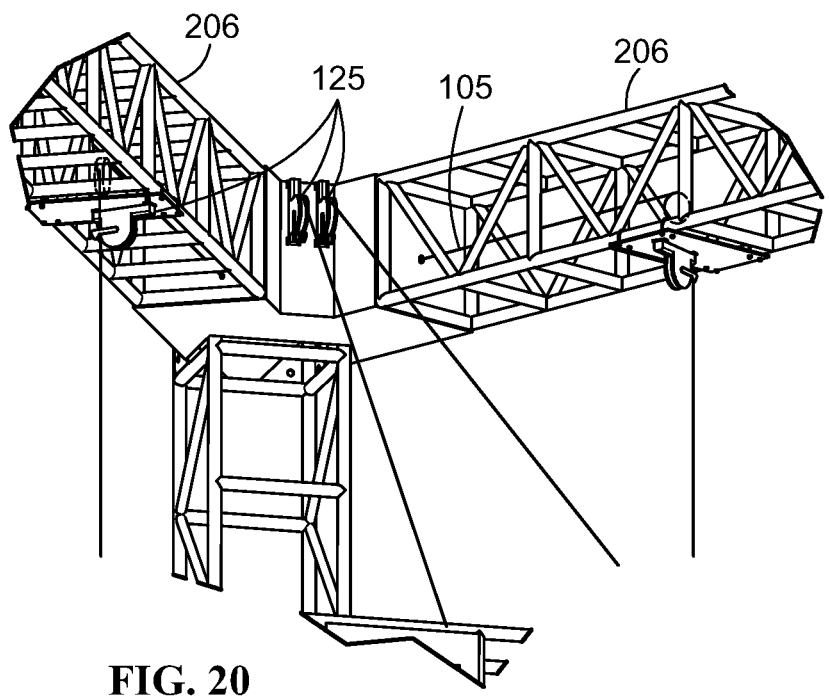
FIG. 20 shows a reverse lower perspective view of an exemplary sheave assembly taken from region 20 of FIG. 19.
Figure 21:
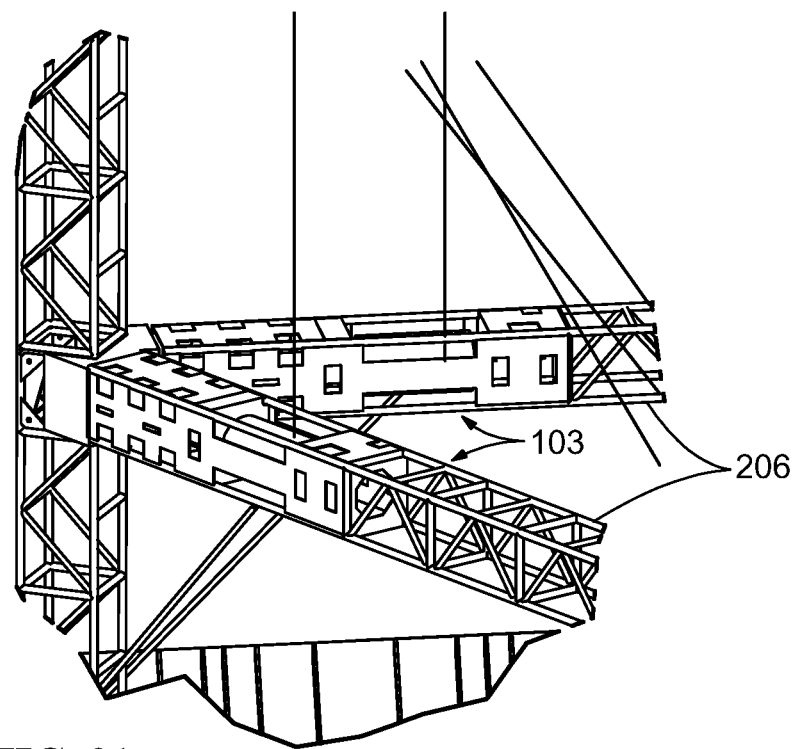
FIG. 21 shows a reverse upper perspective view of an exemplary sheave assembly taken from region 21 of FIG. 19.

FIGS. 13-21 show a ride system 200 having a support structure 204 comprised of interconnected truss members 206 which are part of a suspended load support system that supports a load 109 from cables 105 deployed by winches 103. As shown in FIG. 13, load 109 includes a triangular frame securing and forming a part of a ride platform, such as a ride vehicle or multiple ride vehicles containing ride patrons 138. FIGS. 17-18 show respective front elevation and plan views of a flight envelope 218 for ride patrons 138 within support structure 204. As further shown in FIG. 20 which is taken from a region 20 of FIG. 19, sheaves or pulleys 125 are incorporated in frame structure 204. As further shown in FIG. 21 which is taken from region 20 of FIG. 19, winch systems or winches 103 are integrated into truss members 206, providing a sleek, more compact ride system construction. As further shown in FIG. 19, a ride operator 220 controls the movement of load 109. In one embodiment, a ride patron 138 can control the movement of load 109, such as by a steering wheel, rotatable sphere, joystick or other suitable arrangement.

In one embodiment, the ride experience can be enhanced by use of a display arrangement 222 (FIG. 23) such as a virtual reality ("VR") headset worn by ride patrons 138 riding on a moving platform, such as load 109, which travels along a travel path within a flight envelope 218 (FIGS. 17-18) of the ride system. To optimize a ride experience to be experienced by a ride patron 138, the VR scenery environment displayed to the ride patron preferably is coordinated with movement of the moving platform or load and, additionally, is coordinated with the images displayed by the display arrangement worn by the ride patron (the "viewing script"). To effect this, information can be captured relating to the location and orientation of the display arrangement relative to the moving platform or load and, as well, information can be captured relating to the location and orientation of the display arrangement or VR headset relative to the moving platform or load.

To bring about this optimized ride experience, as shown in FIG. 18, stationary-mounted cameras 224 are mounted on a stationary armature in the form, for example, of support structure 204 or other fixed locations near support structure 204. Cameras 224 capture changes in the location and position of markers 226 (FIG. 23), for example, LED lights, that are arrayed on the VR Headset 222. For purposes herein, this arrangement is referred to as a Real World Studio Environment 234 (FIG. 18) or fixed location.

For purposes herein, VR scenery environment 236 (FIG. 23) is the virtual reality environment displayed to the ride patron via VR headset 222.

Figure 22:
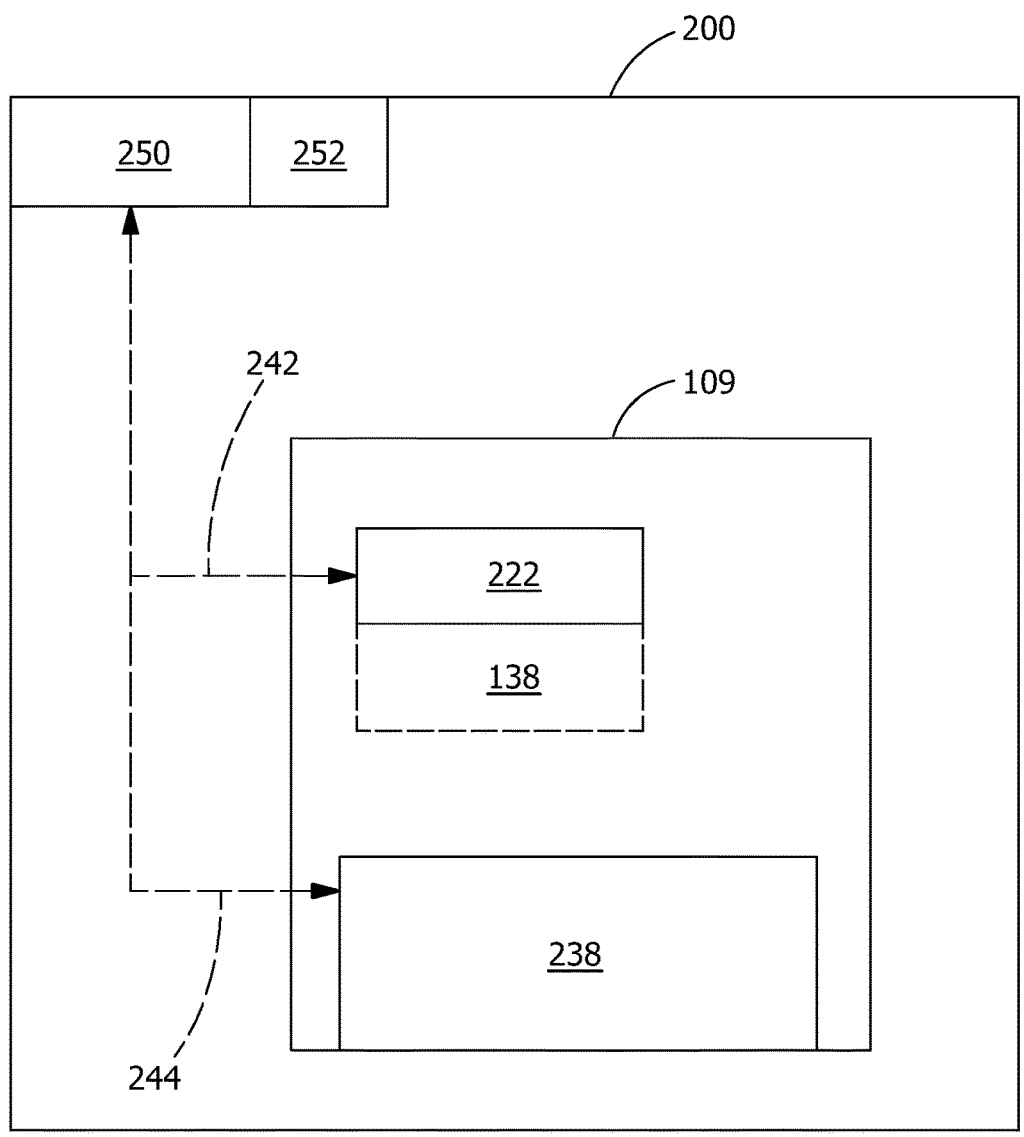
FIG. 22 shows a plan view of a ride patron of an exemplary ride system.

Headset move capture camera data is inputted into a VR interpretation engine to, e.g., coordinate the display of VR scenery environment 236 with the head-turning movements of the ride patron. For example, as shown in FIG. 22, a controller 250 which includes a processor 252 is in data communication 242 with VR headset 222. This arrangement is well known in the art, such as in a manner similar to the control system disclosed in U.S. Pat. Nos. 8,768,492, 9,026, 235 and 9,295,922 entitled Automation and Motion Control System, and not further discussed herein.

The ride system of the present invention adds a novel ride platform environment 240 (FIG. 18), which is the ride platform or load 109 that is in motion relative to real world studio environment 234 (or the fixed outdoor location). Status detecting devices, such as VR headset move capture cameras 238 are now mounted on ride platform or load 109, for example, an overhead triangular truss frame or armature that is secured to the ride platform.

The headset move capture cameras 238 thus move relative to the real world studio environment 234 in the same manner as the VR headset 222 moves relative to the real world studio environment 234 because the headset move capture cameras 238 and the VR headset 222 are located in the same ride platform environment 240.

As shown in FIG. 22, in addition to controller 250 being in data communication 242 with VR headset 222, controller 250 is in data communication with headset move capture cameras 238. The capture of motion data via data connection 244 is effected in the same manner as via data connection 242 with the headset move capture cameras 238 capturing movement of the VR headset 222 as the ride patron 138 looks left, right, straight on, etc. and the cameras 238 recording, e.g., changes in intensity, presence/absence of individual LED lights, etc. In one embodiment, sensors or other status detecting device can be used instead of capture cameras 238 to capture movement of the VR headset 222.

Figure 23:
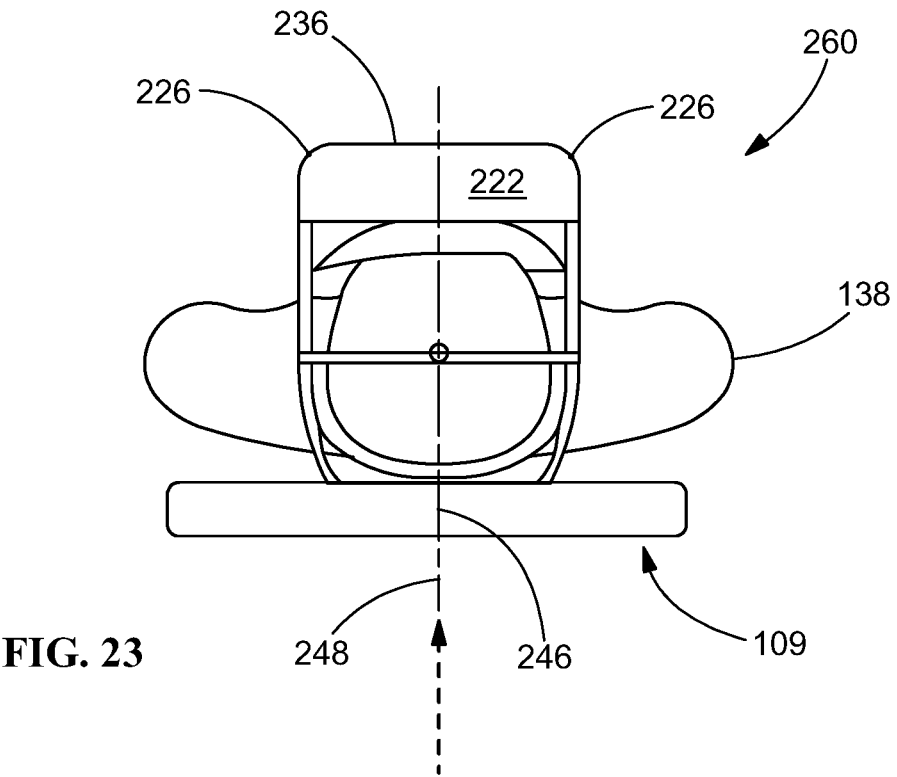
FIG. 23 shows a plan view of a ride patron of an exemplary ride system.

FIG. 23 shows an axis 246 of ride vehicle 109 and a center axis 248 of the head of ride patron 138 being coincident and the posture of the ride patron 138 that brings about this coincidence of the two axes is denominated as a sight orientation 260.

Figure 24:
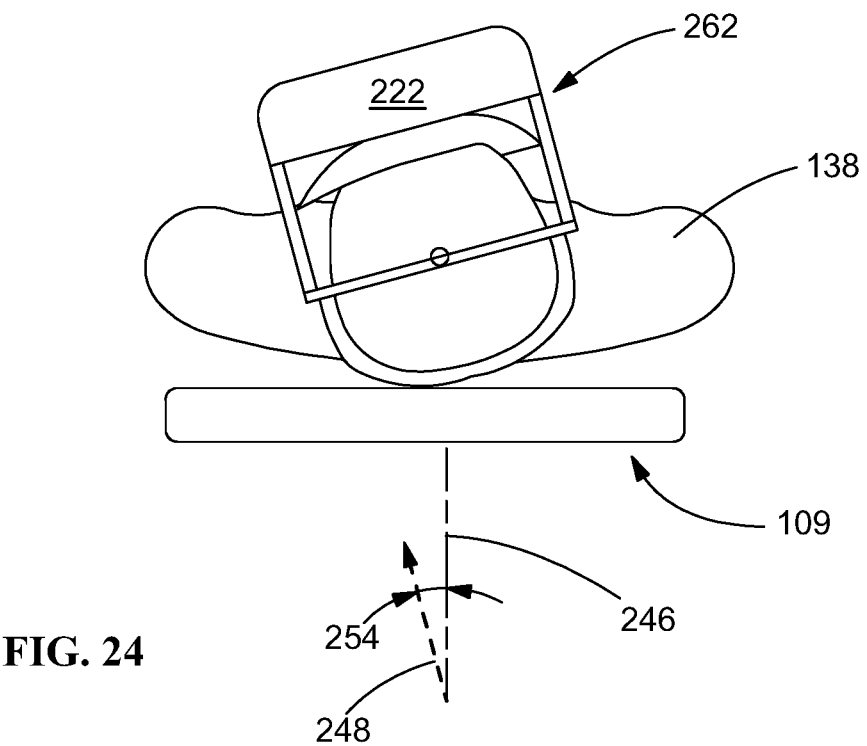
FIG. 24 shows an upper perspective view of an exemplary ride system.

FIG. 24 shows the axis 246 of ride vehicle 109 and the center axis 248 of the head of ride patron 138 subtending an angle 254, with the head of the ride patron being rotated counterclockwise relative to ride vehicle axis 246, and the posture of the ride patron 138 that brings about this orientation of the two axes is denominated as a sight orientation 262.

Figure 25:
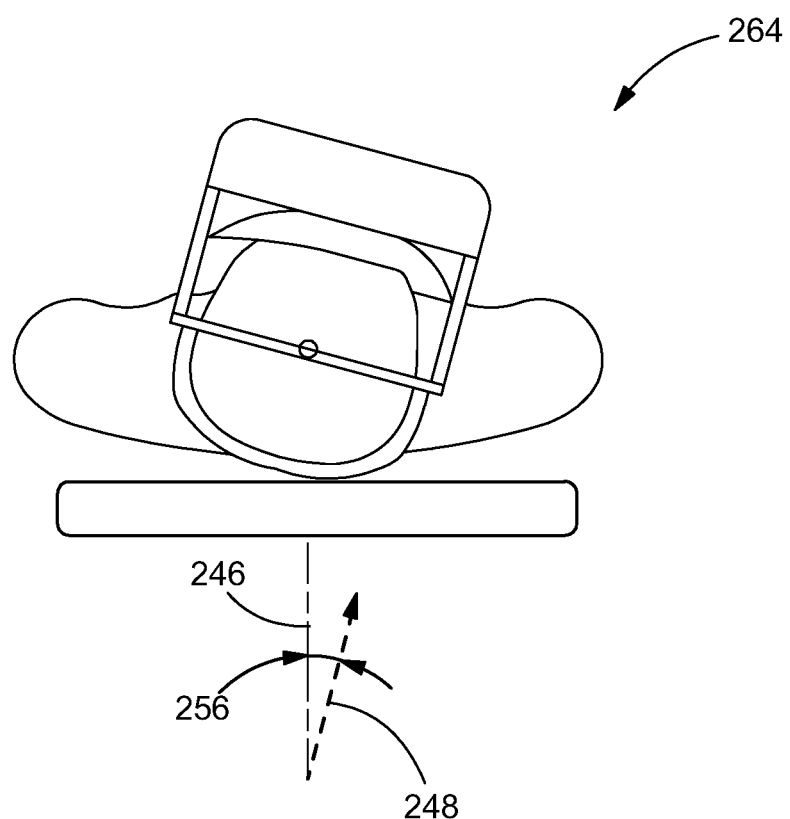
FIG. 25 shows an upper perspective view of an exemplary ride system.

FIG. 25 shows the axis 246 of ride vehicle 109 and the center axis 248 of the head of ride patron 138 subtending an angle 256, with the head of the ride patron being rotated clockwise relative to ride vehicle axis 246, and the posture of the ride patron 138 that brings about this orientation of the two axes is denominated as a sight orientation 264.

It is appreciated that the vector or direction of the head of the ride patron 138 can also simultaneously incorporate a downward looking component or an upwardly looking component as the head of the ride patron 138 is rotated in a clockwise or counterclockwise manner.

Figure 26:
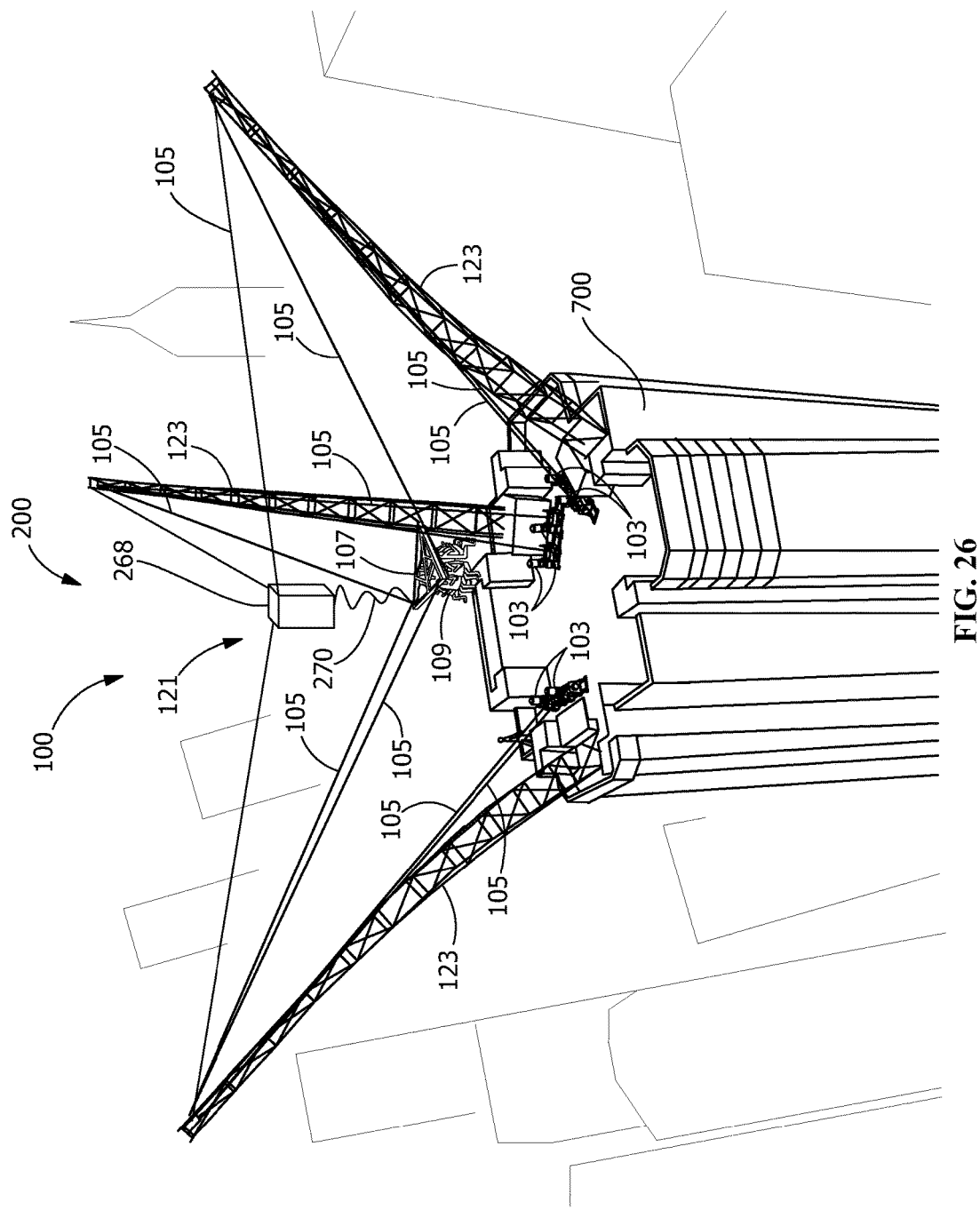
FIG. 26 shows an upper perspective view of an exemplary ride system.

FIG. 26 shows ride system 200 incorporating VR headsets. A receiver/transceiver 268 has a data communication conduit 270 with ride vehicle 109. Receiver/transceiver 268 is movable with ride vehicle 109 via cables 105.

Figure 27:
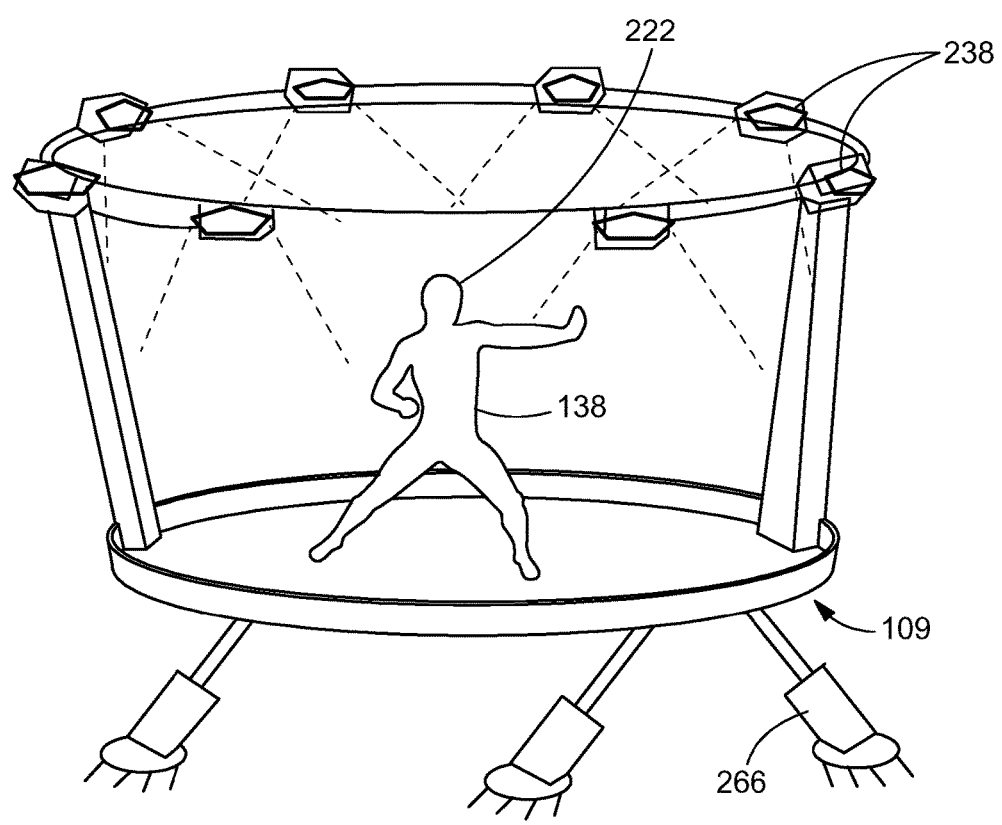
FIG. 27 shows an upper perspective view of an exemplary ride system.

FIG. 27 shows a ride patron 138 on a variation of the ride vehicle 109 that is not part of a suspended load support system. This variation of the ride vehicle 109 is non-suspendedly supported by actuators 266 configured as piston-and-cylinders assemblies each having a cylinder secured to a surface lower than the ride vehicle 109 and a piston controllably extendable into, and retractable from, the cylinder and having its free end secured to the underside of the ride vehicle 109. The actuators 266 are controlled in synchronization to create motion of the ride vehicle in six directions (i.e., six degrees of freedom) as follows: pitch (rotation about a transverse axis parallel to a planar surface of the ride vehicle 109 normally notated as the y-axis in local coordinates); roll (rotation about a longitudinal axis parallel to the planar surface of the ride vehicle 109 normally notated as the x-axis in local coordinates; yaw (rotation about a vertical axis which intersects the x and y axes at their intersection and normally notated as the z-axis in local coordinates); surge (translation along the x-axis); sway (translation along the y-axis); and heave (translation along the z-axis).

The changes in the location and positions of VR headset 222 worn by ride patron 138 are measured as changes relative to ride platform environment 240.

Additionally, data relating to the movement of the ride platform or load relative to the real world studio environment is captured (via, e.g., conventional capture of ride platform movement) or is pre-programmed (e.g., if the ride platform is following a pre-set travel path that cannot be altered via input from the ride patron).

Consequently, both headset move capture camera data and conventional capture of ride platform movement are inputted into the VR interpretation engine to, e.g., coordinate the display of VR scenery with the head-turning movements of the ride patron as well as the travel of the ride platform within the VR scenery.

As shown in FIG. 22, ride patrons 138 wear a display arrangement 222, such as a virtual reality ("VR") headset 222 worn on the head of ride patron 138. In accordance with one aspect of the present disclosure, there is provided a ride system, such as ride system 200. The ride system includes a ride vehicle, wherein this component of the ride system may be, for example, the load 109, and the ride vehicle being operable to support a ride patron 138 during a ride event during which the ride vehicle travels along an event path located within a volume. The ride system additionally includes a display arrangement 222 for displaying a viewing script or VR scenery environment 236 to the ride patron 138 during a ride event, wherein this component of the ride system may be, for example, the virtual reality sub-system including a headset to be worn on the head of the ride patron.

The ride system further includes a motive force assembly operatively connected to the ride vehicle, wherein this component of the ride system may be, for example, comprised of the cables 105, the associated winches 103, and the associated pulleys 125.

The ride system further includes a device 238 for detecting the status of a monitored property that varies in correspondence with a change in the orientation of the head of the ride patron relative to the ride vehicle, wherein this component of the ride system may be, for example, comprised of the tracking camera fixedly mounted relative to the load 109 that records images of the headset worn by the ride patron and additionally comprised of a processor 248 for evaluating the recorded images obtained by the tracking camera to detect the status of a monitored property that varies in correspondence with a change in the orientation of the head of the ride patron 314 relative to the ride vehicle such as, for example, a monitored property of the orientation, intensity, or the presence or absence of visibility of light-emitting diode (LED) lights arranged on the exterior of the headset.

With regard to further features of the one aspect of the present disclosure, the viewing script has displayed content portions that are displayed for viewing by the ride patron, wherein, at a given reference instance during the travel of the ride vehicle along the event path when the orientation of the head of the ride patron relative to the ride vehicle is at a first given sight orientation such as, for example, the sight orientation 260, a first group of these displayed content portions are displayed within the instantaneous field of vision of the ride patron for viewing by the ride patron, and, at a second instance during the travel of the ride vehicle along the event path when the orientation of the head of the ride patron relative to the ride vehicle is at a second given sight orientation such as, for example, the sight orientation 262 different than the first given sight orientation, a second group of these displayed content portions are displayed within the instantaneous field of vision of the ride patron for viewing by the ride patron.

Also, the motive force assembly is operable to provide at least one input of motive force to the ride vehicle that causes the ride vehicle to be propelled along at least one portion of the event path.

Additionally, the status detecting device 230 is operatively associated with the ride vehicle, the status detecting device having an initial orientation relative to the ride vehicle at the given reference instance during the travel of the ride vehicle along the event path such that the status detecting device detects an initial status of the monitored property, and the status detecting device either being in the initial orientation relative to the ride vehicle at the second instance during the travel of the ride vehicle along the event path or being at a variance from the initial orientation relative to the ride vehicle at the second instance during the travel of the ride vehicle along the event path, and the orientations of the status detecting device at the first given instance and at the second instance during the travel of the ride vehicle along the event path being taken into account in connection with displaying the viewing script viewed by the ride patron during the ride event such that the first group of the displayed content portions of the viewing script are displayed within the instantaneous field of vision of the ride patron for viewing by the ride patron at the first given instance and the second group of the displayed content portions of the viewing script are displayed within the instantaneous field of vision of the ride patron for viewing by the ride patron at the second instance.

With respect to an approach for coordinating movement of the load 109 and the available sight pictures of the viewing script, any suitable coordination approach can be deployed. For example, U.S. Pat. No. 9,303,421 to Jennings describes a load carrying system in the form of a passenger carrier 252 that can carry persons in a theater 300 while 2D or 3D visual images are displayed on an image screen 302. According to U.S. Pat. No. 9,303,421 to Jennings, a software program is created to affect movement of passenger carrier 252 which is synchronized to the visual presentation. As a visual presentation is being displayed on the image screen 302, the software program is used to control each controllable winch to affect movement of the passenger carrier 252 synchronized to the displayed presentation.

The present invention, in a further aspect thereof, provides a method of presenting a viewing script to a ride patron as the ride patron participates in a ride event during which the ride patron is supported on a sled while the sled is in motion and a during which a viewing script is displayed to the ride patron. The method may include additional steps in accordance with interest and needs of a user of the method but the method principally includes the step of generating sled position data comprising a sequence of spatial coordinates each associated with a respective one of a group of waypoints, each waypoint being an actual or projected instantaneous location of the sled as the sled travels along an event path. Additionally, the method includes generating detected status data, the detected status data including data relating to a status of a monitored property that varies in correspondence with a change in the direction of gaze of the ride patron relative to the sled.

The method of the further aspect of the present invention also includes the step of generating a data set including data portraying an association of each given status of the monitored property regarding the direction of gaze of the ride patron with respective ones of the waypoints along the event path, whereupon the data set can be consulted to assess the respective direction of gaze of the ride patron relative to the sled at each waypoint. Furthermore, the method includes displaying the viewing script for viewing by the ride patron, the displayed viewing script being selected in coordination with an assessment of the generated data set, whereby the viewing script viewed by the ride patron is coordinated with any changes in the direction of gaze of the ride patron during the travel of the sled along the event path.

According to additional details of the method of the present invention, in connection with the method, the viewing script provides a group of available sight pictures, each available sight picture delimiting an image area having portions each of which can be filled in with images available for viewing by the ride patron as a function of an instantaneous orientation of the ride patron toward the respective portion of the image area. The available sight picture includes a center extent of displayed content extending around an arbitrary centerpoint of the image area and a bordering extent of displayed content that encircles the center extent of displayed content.

With further regard to additional details of the method of the present invention, in connection with the method, the viewing script is coordinated with the orientation of the sled relative to a reference location in a manner such that, at each instantaneous position of the sled relative to the reference location, the viewing script provides the same available sight picture. Moreover, in dependence upon the actual or estimated gaze direction of the ride patron, at some of the instantaneous positions of the sled relative to the reference location during which the gaze direction of the ride patron is substantially centered on the centerpoint of the image area delimited by the respective available sight picture, the center extent of displayed content of the respective available sight picture is viewable by the ride patron, and, at others of the instantaneous positions of the sled relative to the reference location during the gaze direction of the ride patron is not substantially centered on the centerpoint of the image area delimited by the respective available sight picture, both a portion of the bordering extent of displayed content and none, or less than the entirety of, the center extent of displayed content of the respective available sight picture, are viewable by the ride patron.

With yet further regard to additional details of the method of the present invention, in connection with the method, the method may optionally include the step of introducing during the event ride at least one change in the instantaneous position of the sled relative to the reference location that is an instantaneous position change that had not been coordinated prior to the commencement of the event ride with any pre-configured sequence of displaying the available sight pictures of the viewing script, the step of generating detected status data includes generating, at the time of the execution of the introduced instantaneous position change, data relating to a status of a monitored property that varies in correspondence with a change in the direction of gaze of the ride patron relative to the sled, and the step of generating sled position data includes performing a substantially real-time determination of the spatial coordinates of at least one waypoint at the time of the execution of the introduced instantaneous position change.

In accordance with one implementation approach for the method of the present invention, the monitored property that varies in correspondence with a change in the direction of gaze of the ride patron relative to the sled is a property whose value varies as a function of at least one of a change of orientation of the head of the ride patron relative to the sled or a change in the orientation of the eyes of the ride patron relative to the sled.

Figure 28:
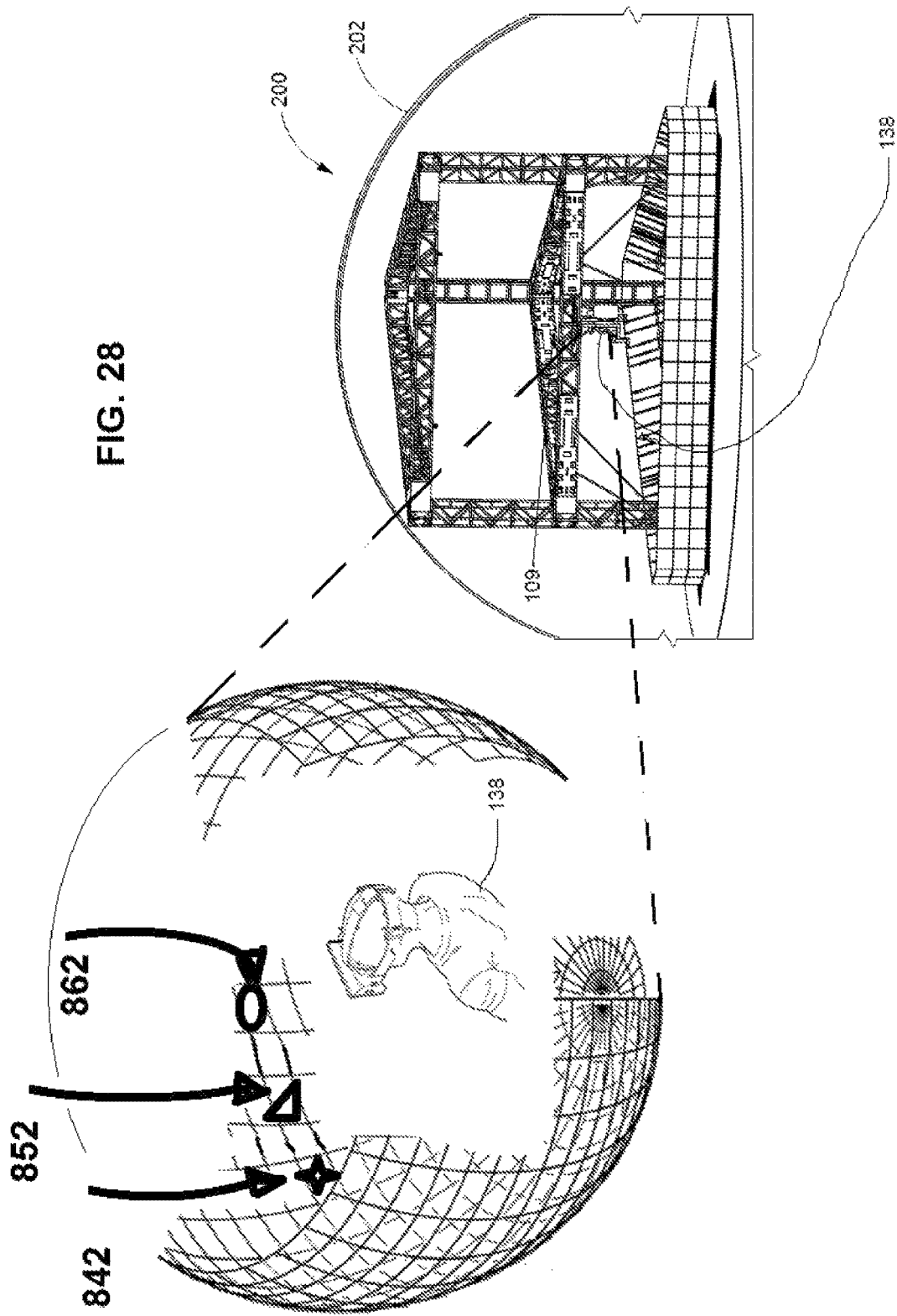
FIG. 28 shows an enlarged schematic perspective view of the ride patron 138 and showing a swept region that is hypothetically represented as a semi-hemispherical surface intersected by projection lines of all of the respective gaze directions of the ride patron.
Figure 29:
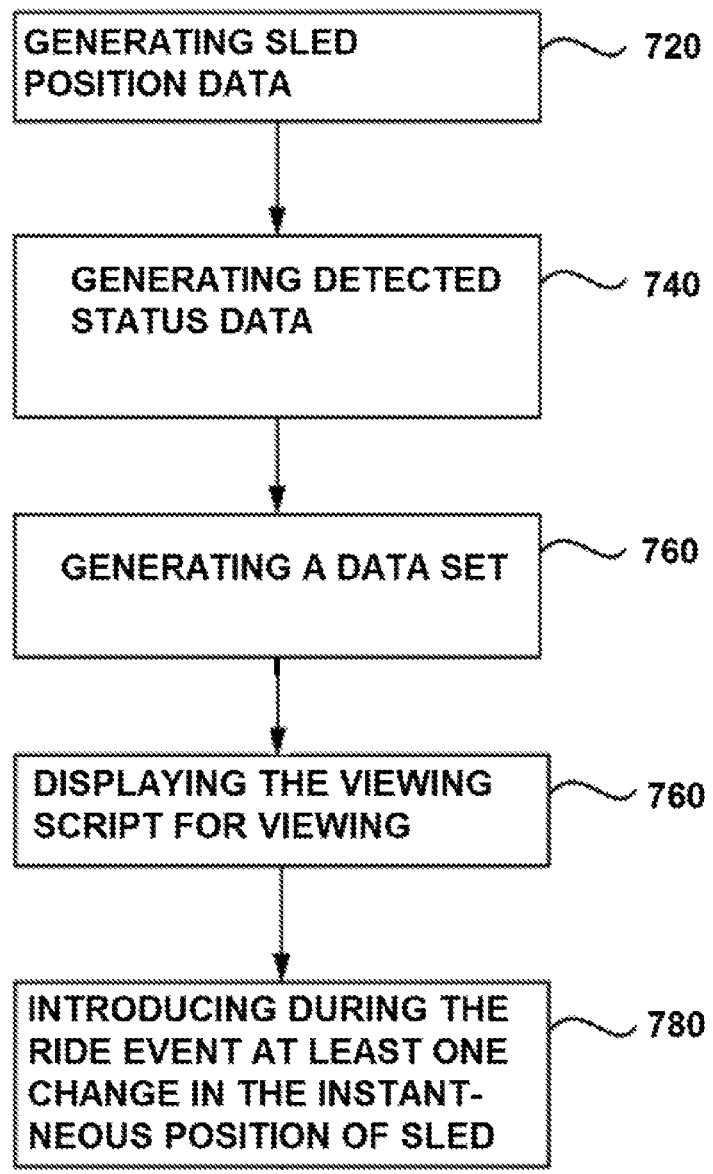
FIG. 29 shows a schematic depiction of an exemplary execution of the method of presenting a viewing script to a ride patron as the ride patron participates in a ride event.
Figure 31:
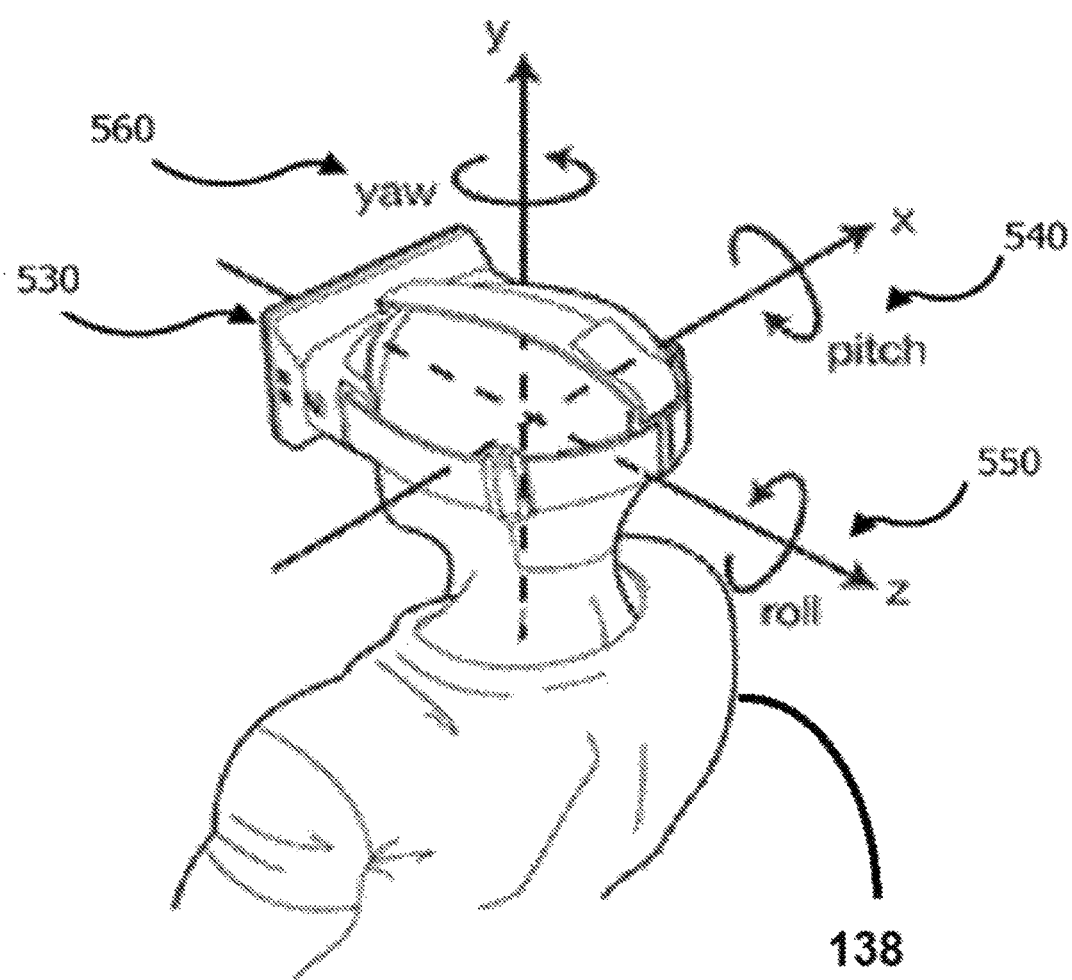
FIG. 31 shows an enlarged top perspective view of a ride patron having a virtual reality headset.

Reference is now had to FIGS. 28, 29 and 31 in connection with a description of an exemplary execution of the method of presenting a viewing script to a ride patron as the ride patron participates in a ride event during which the ride patron is supported on a sled while the sled is in motion and a during which a viewing script is displayed to the ride patron. As seen in FIG. 28, which is an enlarged schematic perspective view of the ride patron 138 and showing a swept region that is hypothetically represented as a semi-hemispherical surface intersected by projection lines of all of the respective gaze directions of the ride patron, a ride patron 138 is supported on the load 109, which is exemplarily shown as a sled, while the sled is in motion and during which a viewing script is displayed to the ride patron. Turning now to FIG. 31, which is an enlarged top perspective view of a ride patron having a virtual reality headset, a ride patron 138 wearing a virtual reality headset 530 is shown. The VR headset 530 is worn over the eyes of the ride patron 138. The head of the ride patron 138 may be considered at the center of a three-dimensional axis with axes of pitch 540, roll 550 and yaw 560. Pitch 540 is an x axis, roll 550 is a z axis and yaw 560 is a y axis in a three-dimensional Cartesian coordinate system.

As seen in FIG. 29, which is a schematic plan view of an exemplary execution of the method of presenting a viewing script to a ride patron as the ride patron participates in a ride event, the exemplary execution of the method of presenting a viewing script includes a step 720 of generating sled position data comprising a sequence of spatial coordinates each associated with a respective one of a group of waypoints, each waypoint being an actual or projected instantaneous location of the sled as the sled travels along an event path. Additionally, the method includes a step 740 of generating detected status data, the detected status data including data relating to a status of a monitored property that varies in correspondence with a change in the direction of gaze of the ride patron 138 relative to the load 109.

The exemplary execution of the method of presenting a viewing script also includes a step 760 of generating a data set including data portraying an association of each given status of the monitored property regarding the direction of gaze of the ride patron 138 with respective ones of the waypoints along the event path, whereupon the data set can be consulted to assess the respective direction of gaze of the ride patron relative to the load 109 at each waypoint. Furthermore, the exemplary execution of the method of presenting a viewing script includes a step 780 of displaying the viewing script for viewing by the ride patron 138, the displayed viewing script being selected in coordination with an assessment of the generated data set that had been generated in connection with the execution of the step 760, whereby the viewing script viewed by the ride patron 138 is coordinated with any changes in the direction of gaze of the ride patron 138 during the travel of the load 109 along the event path. Additionally, the exemplary execution of the method of presenting a viewing script includes a step 782 of introducing during the event ride at least one change in the instantaneous position of the sled relative to the reference location that is an instantaneous position change that had not been coordinated prior to the commencement of the event ride with any pre-configured sequence of displaying the available sight pictures of the viewing script. In connection with the exemplary execution of the method of presenting a viewing script the step 740 of generating detected status data includes generating, at the time of the execution of the introduced instantaneous position change, data relating to a status of a monitored property that varies in correspondence with a change in the direction of gaze of the ride patron relative to the sled, and the step of generating sled position data 760 includes performing a substantially real-time determination of the spatial coordinates of at least one waypoint at the time of the execution of the introduced instantaneous position change.

The available sight picture includes a center extent of displayed content extending around an arbitrary centerpoint CP of the image area and a bordering extent of displayed content that encircles the center extent of displayed content. For example, as seen in FIG. 30A, which is a schematic perspective view of the ride patron shown in FIG. 28, this illustration schematically shows an instantaneous position of the ride patron 138 at a time during the event at which the gaze direction of the ride patron is substantially centered on the centerpoint CP of an arbitrarily designated image area 820 delimited by the respective available sight picture.

As seen in FIG. 28, the respective available sight picture is to understood as an arbitrarily limited swept region whose periphery is drawn with regard to an arbitrary range of possible gaze directions of the ride patron 138 that the ride patron 138 can achieve via a raising or a lowering of the head (a "pitch" movement), via or a turn to the right or a turn to the left of the head (a "yaw" motion), via a tilt to the right or a tilt to the left of the head (a "roll" motion), or via any combination of such pitch, yaw, and roll motions of the head of the ride patron, in order to dispose the Virtual reality headset 530 at the instantaneous orientation of the virtual reality headset 530 relative to the load 109 at which it is disposed at a given instant during the event. The arbitrarily limited swept region is to understood as a conceptual parallel marker for guiding the selection and presentation of the displayed content and the arbitrarily limited swept region in its role as a conceptual parallel marker conceptually represents a predetermined universe or range of gaze directions of the ride patron 138 each having the common property that displayed content will be available to the ride patron in the event that the ride patron is looking or gazing in such gaze direction. This universe or range of gaze directions of the ride patron 138 may comprise the entirety or totality of all of the possible gaze directions of the ride patron 138—e.g., the arbitrarily limited swept region in such event can be visualized as the "globe" representing the polar coordinates shown in FIG. 28. Alternatively, this universe or range of gaze directions of the ride patron 138 may comprise less than the entirety or totality of all of the possible gaze directions of the ride patron 138—as an example, the arbitrarily limited swept region in such event can be visualized as one-half of the "globe" representing the polar coordinates shown in FIG. 28—e.g., a semi-hemispherical portion of the "globe." Such an exemplary swept region that is hypothetically represented as a semi-hemispherical surface is intersected by projection lines of all of the respective gaze directions of the ride patron 138 that will permit the ride patron to view the area in which a sight picture filled with displayed content will be made available for viewing at the given instant during the event. Also, such an exemplary swept region that is hypothetically represented as a semi-hemispherical surface is bisected by a plane in which is located the respective gaze direction of the ride patron 138 in a "straight on" manner (i.e., a head positon with no pitch, yaw, and roll motions) at the given instant during the event.

The centerpoint CP of the arbitrarily designated image area 820 delimited by the respective available sight picture is a geometric mid-point delimited by the rectilinear border of the arbitrarily designated image area 820 and is not a visually observable portion of the image area 820 but is, instead, a hypothetical construct provided solely for the purpose of understanding the exemplary execution of the method of presenting a viewing script.

Reference is now had to FIG. 30A, FIG. 30B, FIG. 32A, FIG. 32B, FIG. 34A, and FIG. 34B, each of which is a schematic view of a ride patron and the sled at a given instant during a ride event, for an illustration of an exemplary execution of the step 782 of introducing during the event ride at least one not previously-coordinated change in the instantaneous position of the load 109 relative to the reference location. FIG. 30A illustrates the ride patron 138 and the load 109 at the given instant during the event and, for the sake of describing the exemplary execution of the method of presenting a viewing script, let it be assumed that, at the given instance depicted in FIG. 30A, (a) the respective gaze direction of the ride patron 138 is in a "straight on" or "straight ahead" manner (i.e., a head positon at which the pitch, yaw, and roll vectors and value are null or zero) and (b) the direction of gaze of the ride patron 138 extends through the centerpoint CP of the image area, which, at the given instant of the event, is located in an arcuate portion 820A of the "globe", which may be understood as being similar to a pixel or a voxel, and which is depicted as an arbitrary four-point geometric symbol 842. An enlarged view of this rectilinear portion 820A of the "globe" is shown in broken lines in FIG. 30B. The available sight picture that the ride patron 138 can view at the given instant during the event includes, as seen in FIG. 30B, a center extent 840 of displayed content extending around the centerpoint CP of the image area and a bordering extent 860 of displayed content that encircles the center extent 840 of displayed content.

Assume now that the load 109, immediately after the given instance during the event—namely, at another instance G+1—performs a not previously-coordinated change in the instantaneous position of the load 109 relative to the reference location, with this change in instantaneous position being a turn of the load 109 to the right as viewed in FIG. 28. If during this right turn of the load 109, the ride patron 138 continues to maintain a "straight on" direction of gaze, then, at the new instantaneous position of the load 109 at the instant G+1, the ride patron 138 is now looking or gazing in a respective direction of gaze which is centered on a rectilinear portion 820B of the "globe", as seen in FIG. 32A and FIG. 32B. This new direction of gaze of the ride patron 138 no longer extends through the centerpoint CP of the image area but, instead, as seen in FIG. 32B, which is an enlarged view of this rectilinear portion 820B of the "globe", now extends through a point (on the "globe") that is offset from the centerpoint CP—namely, a point which is depicted as an arbitrary triangle geometric symbol 852.

Assume now that the load 109, immediately after the instance G+1 during the event—namely, at another instance G+2—performs a further not previously-coordinated change in the instantaneous position of the load 109 relative to the reference location, with this change in instantaneous position being a further turn of the load 109 to the right as viewed in FIG. 28. If during this right turn of the load 109, the ride patron 138 continues to maintain a "straight on" direction of gaze, then, at the new instantaneous position of the load 109 at the instant G+2, the ride patron 138 is now looking or gazing in a respective direction of gaze which is centered on a rectilinear portion 820C of the "globe", as seen in FIG. 34A and FIG. 34B. This new direction of gaze of the ride patron 138 no longer extends through the centerpoint CP of the image area but, instead, as seen in FIG. 34B, which is an enlarged view of this rectilinear portion 820C of the "globe", this new direction of gaze of the ride patron 138 now extends through a point (on the "globe") that is offset from the centerpoint CP and, in fact, is offset from the centerpoint CP to a greater degree than the offset of the direction of gaze of the ride patron 138 described with respect to FIG. 32A and FIG. 32B. This new direction of gaze of the ride patron 138 now extends through a point (on the "globe") which is depicted as an arbitrary circle geometric symbol 862. The offset of the direction of gaze of the ride patron 138 relative to the centerpoint CP at the instant G+2 is of a magnitude that the centerpoint CP is not located in the rectilinear portion 820C of the "globe."

In the event that the ride patron operates a prop such as, for example, a hand-held target activating device, and the presentation of the available sight pictures of the viewing script is coordinated with the movement of the prop such as, for example, a movement to point or aim the hand-held target activating device at a target displayed on the viewing script, the method may optionally be implemented in a manner in which an avatar of the device appears on the viewing script and the avatar moves relative to other depictions on the viewing script in correspondence with movement of the hand-held target activating device by the ride patron.

While only certain features and embodiments of the invention have been shown and described, many modifications and changes may occur to those skilled in the art (for example, variations in sizes, dimensions, structures, shapes and proportions of the various elements, values of parameters (for example, temperatures, pressures, etc.), mounting arrangements, use of materials, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A ride system comprising:
a ride vehicle, the ride vehicle being operable to support a ride patron during a ride event during which the ride vehicle travels along an event path located within a volume;
a display arrangement for displaying a viewing script to the ride patron during a ride event, the viewing script having displayed content portions that are displayed for viewing by the ride patron, wherein, at a given reference instance during the travel of the ride vehicle along the event path when the orientation of the head of the ride patron relative to the ride vehicle is at a first given sight orientation, a first group of these displayed content portions are displayed within the instantaneous field of vision of the ride patron for viewing by the ride patron, and, at a second instance during the travel of the ride vehicle along the event path when the orientation of the head of the ride patron relative to the ride vehicle is at a second sight orientation different than the first given sight orientation, a second group of these displayed content portions are displayed within the instantaneous field of vision of the ride patron for viewing by the ride patron;
a motive force assembly operatively connected to the ride vehicle, the motive force assembly being operable to provide at least one input of motive force to the ride vehicle that causes the ride vehicle to be propelled along at least one portion of the event path;
a device for detecting the status of a monitored property that varies in correspondence with a change in the orientation of the head of the ride patron relative to the ride vehicle; the status detecting device being operatively associated with the ride vehicle, the status detecting device having an initial orientation relative to the ride vehicle at the given reference instance during the travel of the ride vehicle along the event path such that the status detecting device detects an initial status of the monitored property, and the status detecting device either being in the initial orientation relative to the ride vehicle at the second instance during the travel of the ride vehicle along the event path or being at a variance from the initial orientation relative to the ride vehicle at the second instance during the travel of the ride vehicle along the event path, and the orientations of the status detecting device at the first given instance and at the second instance during the travel of the ride vehicle along the event path being taken into account in connection with displaying the viewing script viewed by the ride patron during the ride event such that the first group of the displayed content portions of the viewing script are displayed within the instantaneous field of vision of the ride patron for viewing by the ride patron at the first given instance and the second group of the displayed content portions of the viewing script are displayed within the instantaneous field of vision of the ride patron for viewing by the ride patron at the second instance.

2. A visualization system comprising:
one or more input devices configured to receive or generate sled event path data, the sled event path data including a sequence of one or more waypoints, each of the waypoints defining an instantaneous position in space of the sled along an event path;
an event path calculation engine configured to generate position data comprising a sequence of one or more spatial coordinates identifying a location of the sled as the sled travels along the event path, the event path generation engine applying one or more laws of motion to generate the position data;
one or more input devices configured to receive detected status data, the detected status data including data relating to a status of a monitored property that varies in correspondence with a change in a direction of gaze of a ride patron relative to a reference direction of the sled, the ride patron supported by the sled as the sled travels along the event path; and
a visualization engine configured to generate a data set including data portraying an association of a respective status of the monitored property at each respective waypoint defining an instantaneous actual or projected position in space of the sled along the event path, whereupon a visualization of the respective direction of gaze of the ride patron relative to the reference direction of the sled at each waypoint can be generated from the data set.

3. The visualization system according to claim 2 and further comprising a translation engine for translating the data set generated by the visualization engine into input to the displayed content portions of the viewing script that correspondingly adjusts the displayed content portions of the viewing script as a function of the direction of gaze of the ride patron relative to the reference direction of the sled.

4. A method of presenting a viewing script to a ride patron as the ride patron participates in a ride event during which the ride patron is supported on a sled while the sled is in motion and a during which a viewing script is displayed to the ride patron, the method comprising the steps of:

generating sled position data comprising a sequence of spatial coordinates each associated with a respective one of a group of waypoints, each waypoint being an actual or projected instantaneous location of the sled as the sled travels along an event path;

generating detected status data, the detected status data including data relating to a status of a monitored property that varies in correspondence with a change in a direction of gaze of the ride patron relative to a reference direction of the sled;

generating a data set including data portraying an association of each given status of the monitored property regarding the direction of gaze of the ride patron with respective ones of the waypoints along the event path, whereupon the data set can be consulted to assess a respective direction of gaze of the ride patron relative to the relative direction of the sled at each waypoint; and displaying the viewing script for viewing by the ride patron, the displayed viewing script being selected in coordination with an assessment of the generated data set, whereby the viewing script viewed by the ride patron is coordinated with any changes in the respective direction of gaze of the ride patron during the travel of the sled along the event path.

5. The method according to claim 4, wherein the viewing script provides a group of available sight pictures, each available sight picture delimiting an image area having portions each of which can be filled in with images available for viewing by the ride patron as a function of an instantaneous orientation of the ride patron toward the respective portion of the image area and the available sight picture includes a center extent of displayed content extending around an arbitrary centerpoint of the image area and a bordering extent of displayed content that encircles the center extent of displayed content, the viewing script is coordinated with the orientation of the sled relative to a reference location in a manner such that, at each instantaneous position of the sled relative to the reference location, the viewing script provides the same available sight picture and, in dependence upon the respective actual or estimated direction of gaze of the ride patron, at some of the instantaneous positions of the sled relative to the reference location during which the direction of gaze of the ride patron is substantially centered on the centerpoint of the image area delimited by the respective available sight picture, the center extent of displayed content of the respective available sight picture is viewable by the ride patron, and, at others of the instantaneous positions of the sled relative to the reference location during the direction of gaze of the ride patron is not substantially centered on the centerpoint of the image area delimited by the respective available sight picture, both a portion of the bordering extent of displayed content and none, or less than the entirety, of the center extent of displayed content of the respective available sight picture, are viewable by the ride patron.

6. The method according to claim 5 and further comprising introducing during the event ride at least one change in the instantaneous position of the sled relative to the reference location that is an instantaneous position change that had not been coordinated prior to the commencement of the event ride with any pre-configured sequence of displaying the available sight pictures of the viewing script, the step of generating detected status data includes generating, at the time of the execution of the introduced instantaneous position change, data relating to a status of a monitored property that varies in correspondence with a change in the direction of gaze of the ride patron relative to the reference direction of the sled, and the step of generating sled position data includes performing a substantially real-time determination of the spatial coordinates of at least one waypoint at the time of the execution of the introduced instantaneous position change.

7. The method according to claim 4, wherein the monitored property that varies in correspondence with a change in the direction of gaze of the ride patron relative to the reference direction of the sled is a property whose value varies as a function of at least one of a change of orientation of the head of the ride patron relative to the sled or a change in the orientation of the eyes of the ride patron relative to the sled.

8. The method according to claim 4, wherein, in the event that the ride patron operates a prop, the prop optionally comprising a hand-held target activating device, and the presentation of the available sight pictures of the viewing script is coordinated with the movement of the prop, the movement optionally comprising a movement to point or aim the hand-held target activating device at a target displayed on the viewing script, wherein the method may optionally be implemented in a manner in which an avatar of the device appears on the viewing script and the avatar moves relative to other depictions on the viewing script in correspondence with movement of the prop by the ride patron.

9. The method according to claim 8, wherein an avatar of the device appears on the viewing script and the depiction of the avatar on the viewing script changes in correspondence with movement of the prop by the ride patron.

* * * * *